(12) United States Patent
Chuang et al.

(10) Patent No.: US 8,908,915 B2
(45) Date of Patent: Dec. 9, 2014

(54) DEVICES AND METHODS FOR TRACKING MOVING OBJECTS

(75) Inventors: Yung-Jen Chuang, Hsinchu (TW); Yung-Chang Chen, Hsinchu (TW); Shih-Yin Huang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 178 days.

(21) Appl. No.: 13/372,293

(22) Filed: Feb. 13, 2012

(65) Prior Publication Data

US 2013/0208943 A1 Aug. 15, 2013

(51) Int. Cl.
*G06T 7/20* (2006.01)

(52) U.S. Cl.
USPC .......................................... 382/103; 382/107

(58) Field of Classification Search
USPC ............................ 382/103; 348/169, 172, 171
See application file for complete search history.

(56) References Cited

U.S. PATENT DOCUMENTS

2009/0059007 A1* 3/2009 Wagg et al. .................... 348/157
2011/0268320 A1* 11/2011 Huang et al. ................. 382/103

OTHER PUBLICATIONS

Ukita et al. "Estimating the Position and Postures of Non-rigid Objects Lacking Sufficient Features Based on the Stick and Ellipse Model." Conference on Computer Vision and Pattern Recognition Workshop, Jun. 2004, 5 pages.*
Yung-Jen Chuang et al.,Thesis, Multiple Zebrafish Tracking and Behavior Analysis, National Tsing Hua University; Jul. 2011.
L.P. Noldus et al., EthoVision: a versatile video tracking system for automation of behavioral experiments, Behavior Research Methods, Instruments, & Computers, 2001, 398-414, 33.
G. Welch et al., An introduction to the Kalman filter, Notes ACM SIGGRAPH Tutorial Kalman Filter, 2001, Course 8.
S. Kato et al., A computer image processing system for quantification of zebrafish behavior, Journal of Neuroscience Methods, 2004, 1-7, 134.
Weiss, Y., Deriving intrinsic images from image sequences, In International Conference on Computer Vision (ICCV 01); (2001); 68-75.
Nikzad Babaii Rizvandi et al., Skeleton analysis of population images for detection of isolated and overlapped nematode C.elegans,16th European Signal Processing Conference (EUSIPCO 2008); Aug. 25-29, 2008.

* cited by examiner

*Primary Examiner* — Jon Chang
(74) *Attorney, Agent, or Firm* — Hannah M. Tien

(57) ABSTRACT

The present invention is directed to methods and devices for tracking moving characteristics of at least two moving objects. The present invention identifies an occlusive condition(s) of the moving objects on a video frame(s), analyzes information of a physical framework(s) of the moving objects, finds and records a position(s) of the occluded moving object(s) on the video frames and tracks a moving character(s) of the moving objects. The present invention further provides devices and methods for tracking the moving characteristics of behaviors of living bodies.

7 Claims, 27 Drawing Sheets
(3 of 27 Drawing Sheet(s) Filed in Color)

FIG. 3
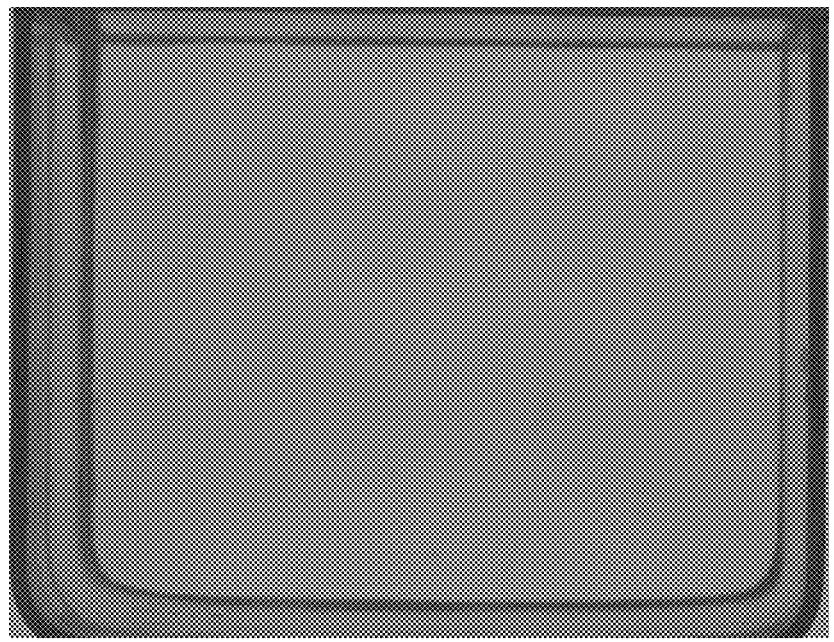
(a)
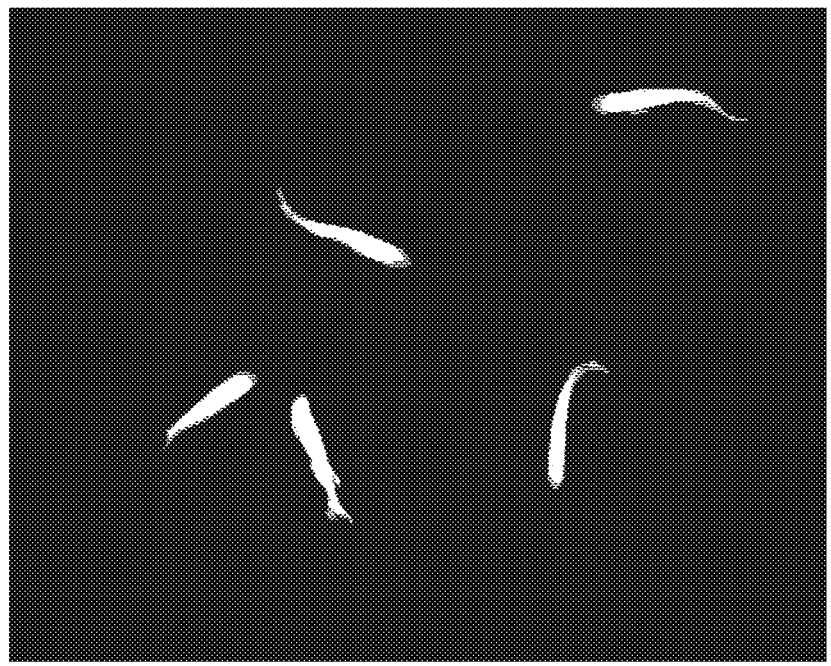
(b)

FIG. 4
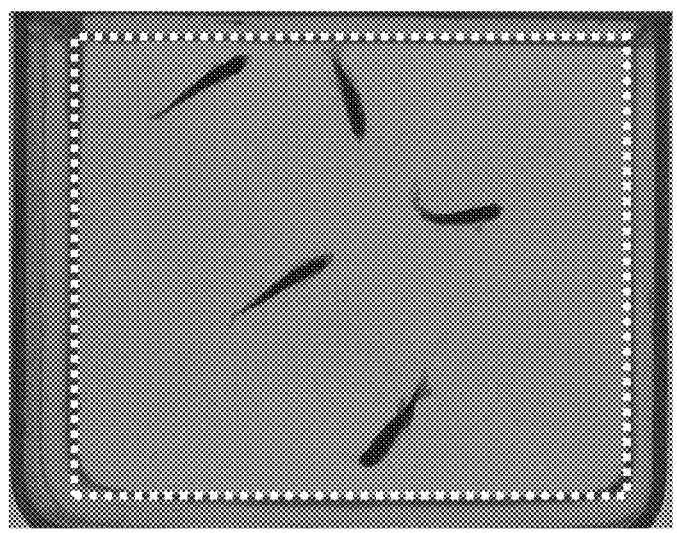
(a)
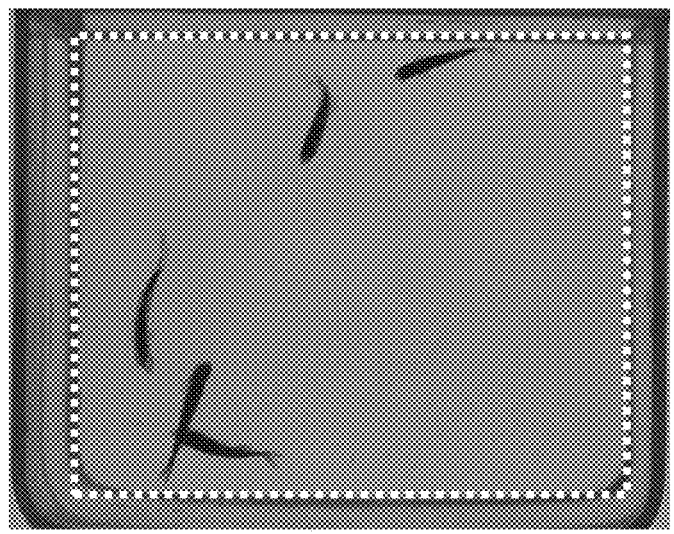
(b)

FIG. 5
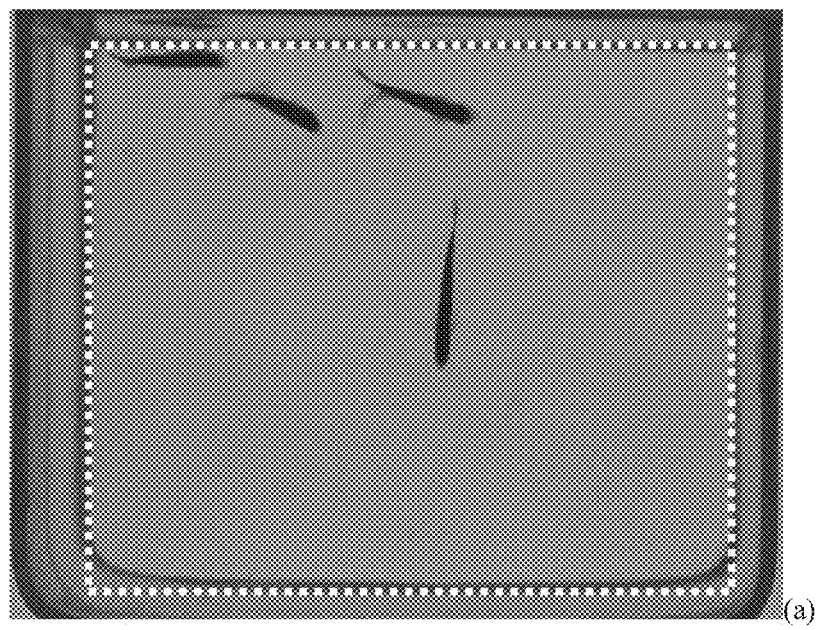
(a)
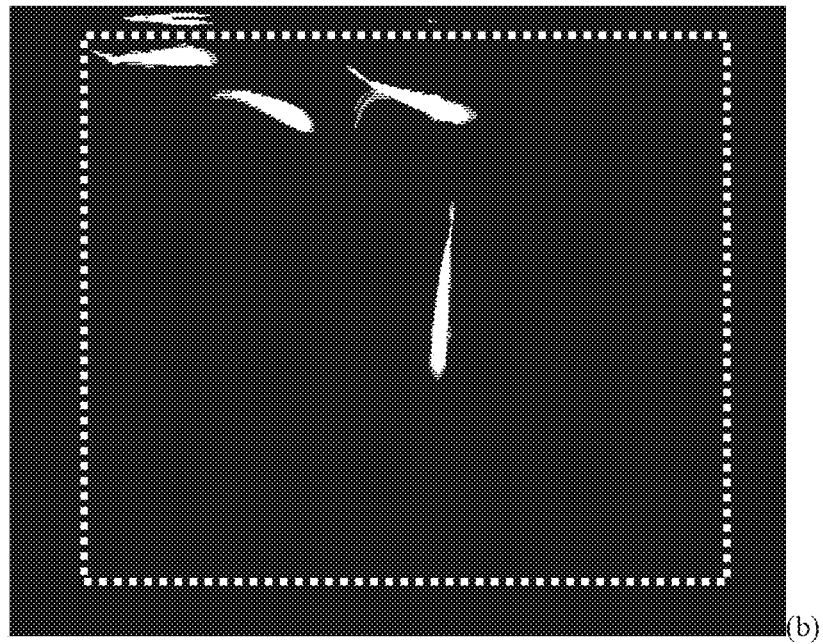
(b)

FIG. 7
(a)
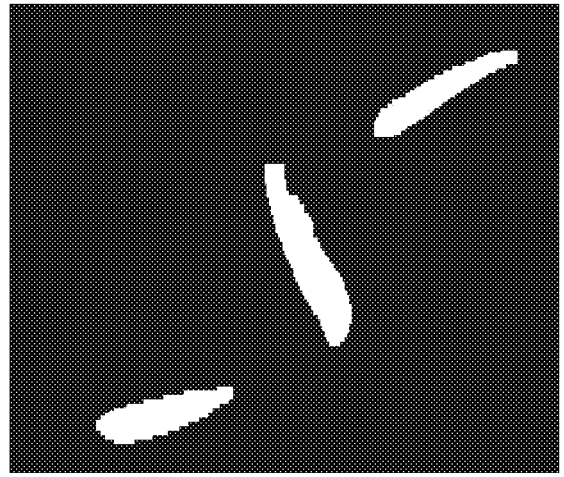
(b)

FIG. 10

Known States (previous frame)

Uncertain States (Current frame)

|   | 1 | 2 | 3 | 4 | 5 |
|---|---|---|---|---|---|
| a |   |   |   |   | ◎ |
| b |   |   | ◎ |   |   |
| c | ◎ |   |   |   |   |
| d |   | ◎ |   |   |   |
| e |   |   |   | ◎ |   |

◎ : Minimum displacement

FIG. 12

|   | R | G | B |
|---|---|---|---|
| A | 0.5 | 1 | 2 |
| B | 4 | 3 | 4 |
| C | 2 | 4 | 3 |

Known States (previous frame)
Uncertain States (Current frame)

(a)

|   | R | G | B |
|---|---|---|---|
| A | 0.5 | Inf. | Inf. |
| B | 4 | 3 | 4 |
| C | 2 | 4 | 3 |

Known States (previous frame)
Uncertain States (Current frame)

(b)

FIG. 14
(a)
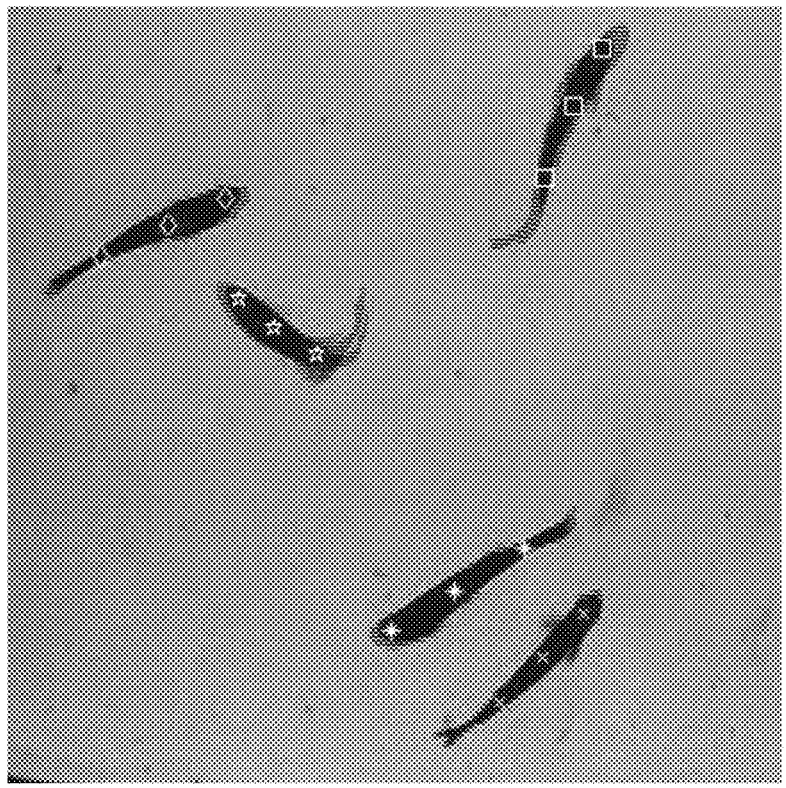
(b)
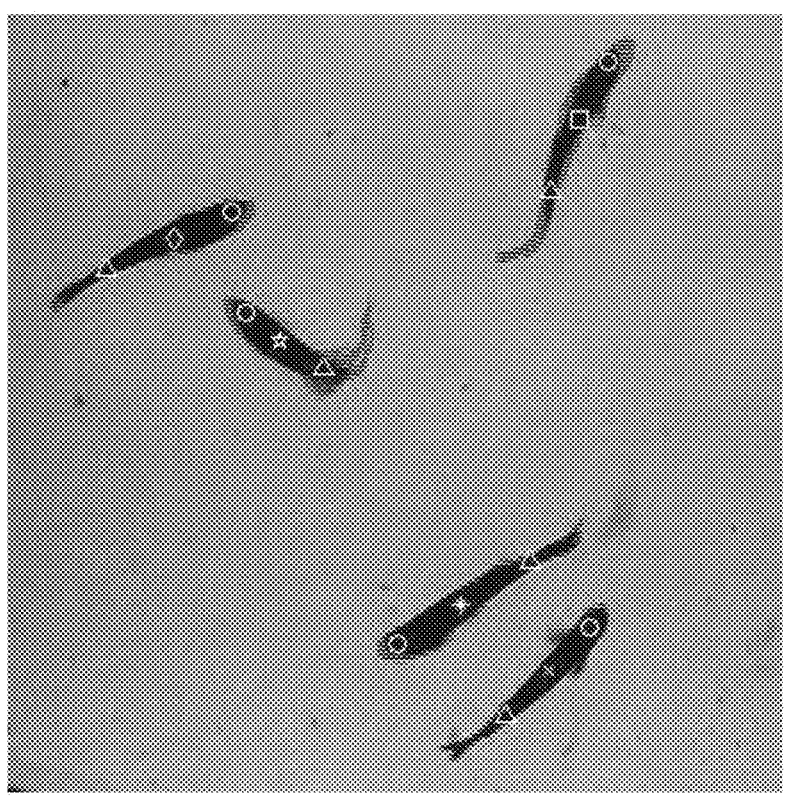

FIG. 15
(a)
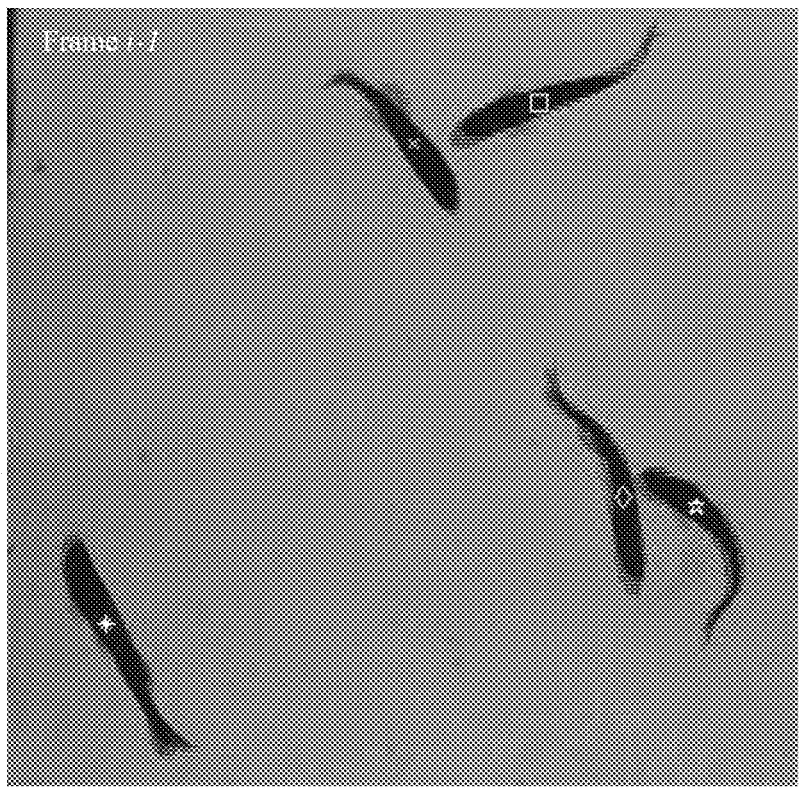
(b)
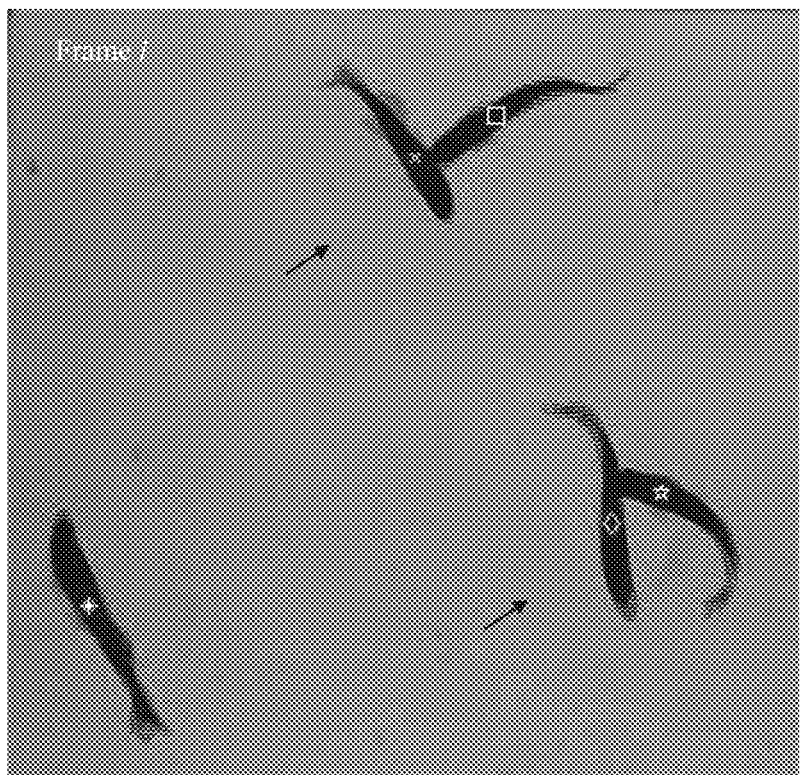

FIG. 16

Current frame

| | End 1 | End 2 | End 3 | ... |
|---|---|---|---|---|
| Head1 | | | ◎ | |
| Head2 | ◎ | | | |

Previous frame

◎ : Minimum displacement

Current frame

|  | End 1 | End 2 | End 3 | End 4 | ... |
|---|---|---|---|---|---|
| Head 1 |  | ◎ |  |  |  |
| Tail 1 |  |  | ◎ |  |  |
| Head 2 | ◎ |  |  |  |  |
| Tail 2 |  |  |  | ◎ |  |

Previous frame (b)

Current frame

|  | End 1 | End 2 | End 3 | End 4 | End 5 |
|---|---|---|---|---|---|
| Head 1 |  | ◎ |  |  |  |
| Tail 1 |  |  | ◎ |  | ◎ |
| Head 2 | ◎ |  |  |  |  |
| Tail 2 |  |  |  | ◎ |  |

Previous frame

←---- Double check

◎ : Minimum displacement

FIG. 19
(a)
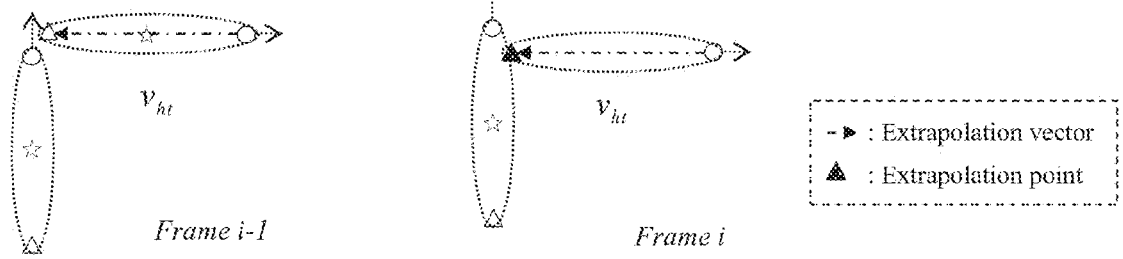
(b)
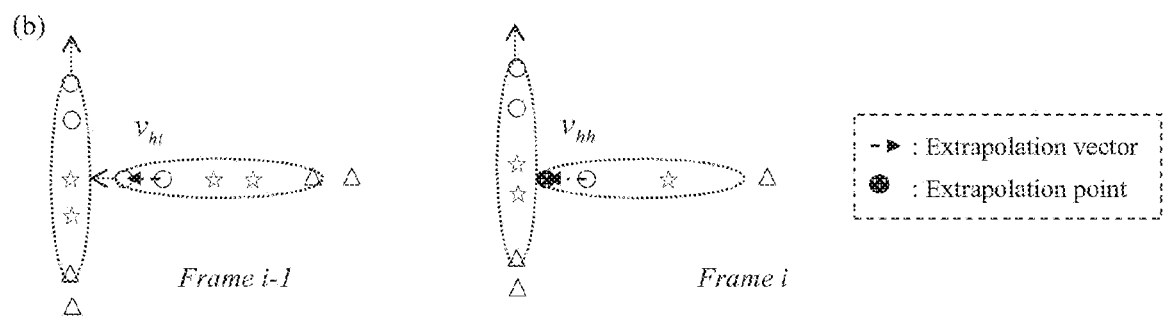
(c)
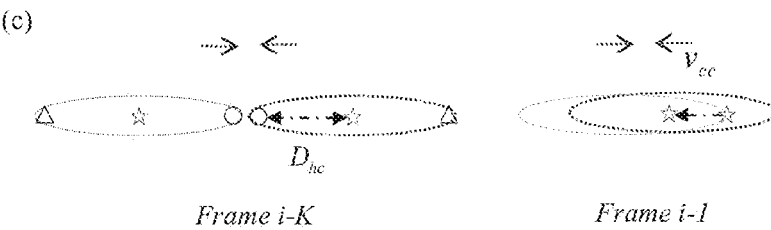
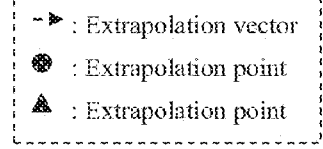
Frame i FIG. 24
(a)
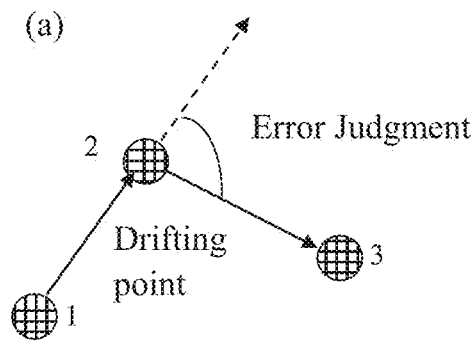
(b)
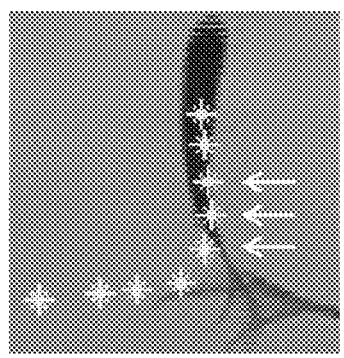
(c)
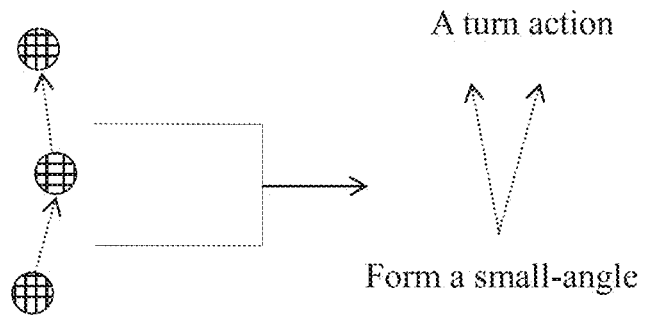

FIG. 25
(a)
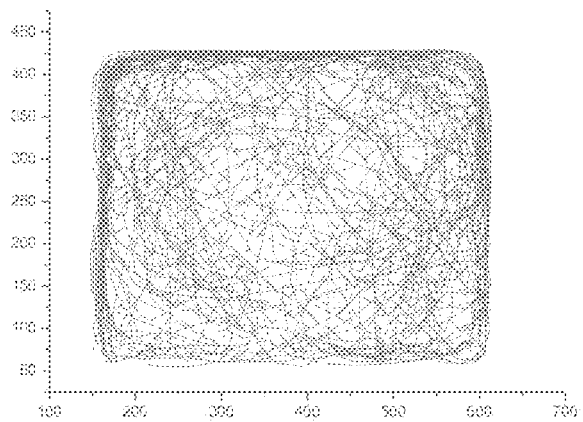
(b)
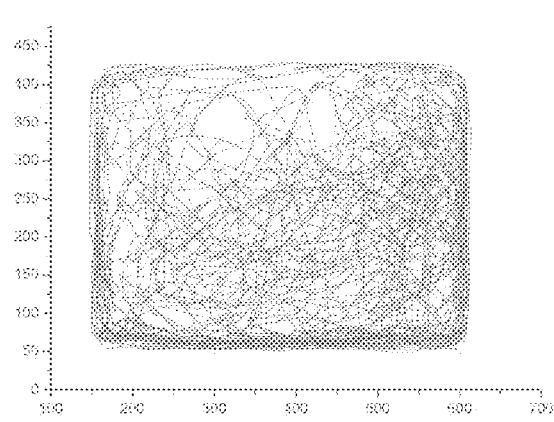
(c)
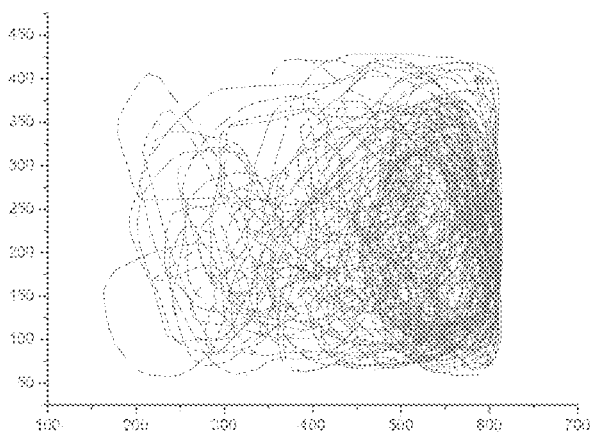
(d)
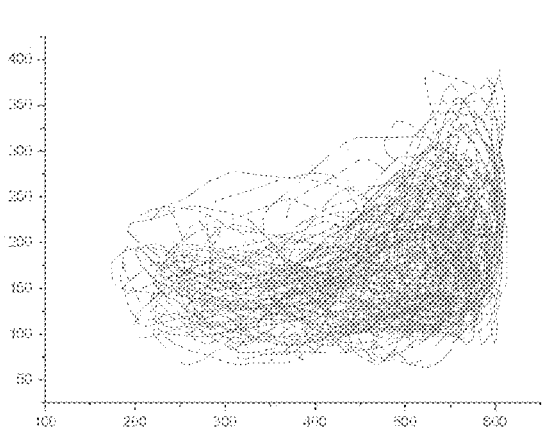

DEVICES AND METHODS FOR TRACKING MOVING OBJECTS

FIELD OF THE INVENTION

This invention relates to devices and methods for tracking moving characteristics of moving objects. This invention also relates to devices and methods for analyzing an occlusion(s) of moving objects on a video picture and tracking the moving characteristics of moving objects. This invention further relates to devices and methods for tracking the moving characteristics of behaviors of living bodies.

DESCRIPTION OF PRIOR ART

In the past few years, many articles have been devoted to the study of object tracking. Object tracking also has received significant attention due to the wide range of its applications, for example gesture recognition, body and face pose estimation, facial expression analysis and recognition, surveillance system etc. In these works, object tracking plays an important role in the overall process. As for the tracking algorithms, it can be characterized by the following factors:

Tracking objects, such as car, human body parts: face, hand, etc.

The number of views: single-view, multiple-view.

The state of the camera: moving or stationary.

The tracking environment: indoors or outdoors.

The number of tracked objects: single object, multiple objects.

Tracking over time involves matching the coherence relation of object information (position, velocity, color, texture, shape, etc.) in consecutive frames. In short, object tracking methods attempt to identify corresponding relations of image parameter between frames. The prediction scheme is also the case that tracking objects in consecutive frames. Based on the information of previous frames, the state of the object is predicted and compared with the real state identified in the actual frame. Kalman filter is an excellent framework for the prediction scheme (G. Welch and G. Bishop, An introduction to the Kalman filter. Notes ACM SIGGRAPH Tutorial Kalman Filter, 2001).

Animal models have been developed for animal behavioral experiments of the biological research for a long time. Research workers usually use laboratory animals as models of humans or some other target species. The animal model is widely used for preventing the risk associated with human trials or for researches which could not be done on humans for practical or ethical reasons, such as developing a new drug, screening a particular compound for human toxicity, studying a gene or mutation found in both animals and humans or studying a fundamental process such as gene transcription. The animal model is also used for experiments of determining the responds of treatments.

For behavioral experiment, commonly, the behavior of animals is recorded by a manual or a semi-automated way. For some behavior, manual recording may be the only way to detect and record, but human error may cause some unexpected incorrect data thereby reducing the validity of an experiment. Computerized video-tracking tools relatively have several advantages. First, it is reliable. Second, the system does not suffer from observer fatigue or drift. Third, particularly in measuring locomotor behavior (distance, speed, turning, etc.) for human unable to estimate accurately, computerized video-tracking tools perform better than manual recording (L. P. Noldus, et al. (2001) "EthoVision: a versatile video tracking system for automation of behavioral experiments", Behav Res Methods Instrum Comput. 33, pp. 398-414).

However, an important issue of tracking algorithm is directed to handle occlusions. Occlusion is divided into two types partially or totally occluded by another object. Occlusion causes a lot of unexpected tracking error, but several tracking techniques assume no occlusion at all. During tracking, occlusion of multiple objects may occur constantly, especially in the case of tracking a group of small animals.

For the reasons which are mentioned above, the presenting invention provides a novel automatic separating method which detects the occlusion of moving objects and identifies the correct positions of moving objects on the video frames to provide a better tracking efficiency for tracking multiple moving objects.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 shows an embodiment of the invention, (a) is a reconstructed background of a tracking environment and (b) is a binary map of the foreground of a video frame.

FIG. 4 shows an embodiment of the invention, (a) is a non-occlusion frame and (b) is an occlusion frame of the moving objects. The dotted line means the tracking rectangle of the video frame.

FIG. 5 shows an embodiment of the invention, a tracking rectangle of a video frame and its binary map, wherein the dotted line means the tracking rectangle.

FIG. 7 (a) shows the binary map of the moving objects on a video frame, and (b) shows the opening result of the binary map of the moving objects on a video frame.

FIG. 10 shows the state assignment on a distance map of the moving objects on two sequential video frames, wherein the ⊙ denotes the minimum displacement.

FIG. 12 (a) shows a distance map of a state with multiple assignments in the same time, and (b) shows the modified distance map after double check the minimum displacement.

FIG. 14 (a) shows the result of classifying the centroid and endpoints of a fish, wherein the □, *, ☆, x and ◇ denote the centroid and endpoints, (b) shows the result of characterizing the centroid, head and tail point of a fish, wherein the □, *, ☆, x and ◇ denote the centroid, the ○ denotes head and the △ denotes tail.

FIG. 15 (a) shows the previous frame of two sequential frames, and (b) shows the posterior frame of two sequential frames with an occlusion situation, wherein the □, *, ☆, x and ◇ denote the centroid.

FIG. 16 shows an example of distance map, wherein the ⊙ denotes the minimum displacement.

FIG. 18 (a) shows an example of distance map, (b) shows an example of a distance map with multiple assignments in the same time, wherein the ⊙ denotes the minimum displacement.

FIG. 19 (a) shows the procedure of extrapolating the information of the hidden tail of the occluded fish, wherein $v_{ht}$ is the vector of head to tail, (b) shows the procedure of extrapolating the information of the hidden head of the occluded fish, wherein $v_{hh}$ is the vector of head to head, and (c) shows the procedure of extrapolating the information of the hidden head and tail of the occluded fish, wherein $v_{cc}$ is a unit vector, $D_{hc}$ is a scalar, for all tree sub-figure in FIG. 19 ○ denotes head points, Δ denotes tail points, ☆ denotes centroid.

FIG. 24 shows examples of the turn angle analysis. The sub-figure (a) shows an error judgment of turn angle and (b) shows an example of a straight path but after turn angle detection, wherein the * denotes the centroid, and (c) shows the turn action which is pointed out by arrows in FIG. 24(b).

FIG. 25 shows an example of behavior analysis experiment. The sub-figures (a) and (b) show the individual path diagram of the control fish. The sub-figure (c) and (d) shows the individual path diagram of the lesion fish.

SUMMARY OF THE INVENTION

Figure 1:
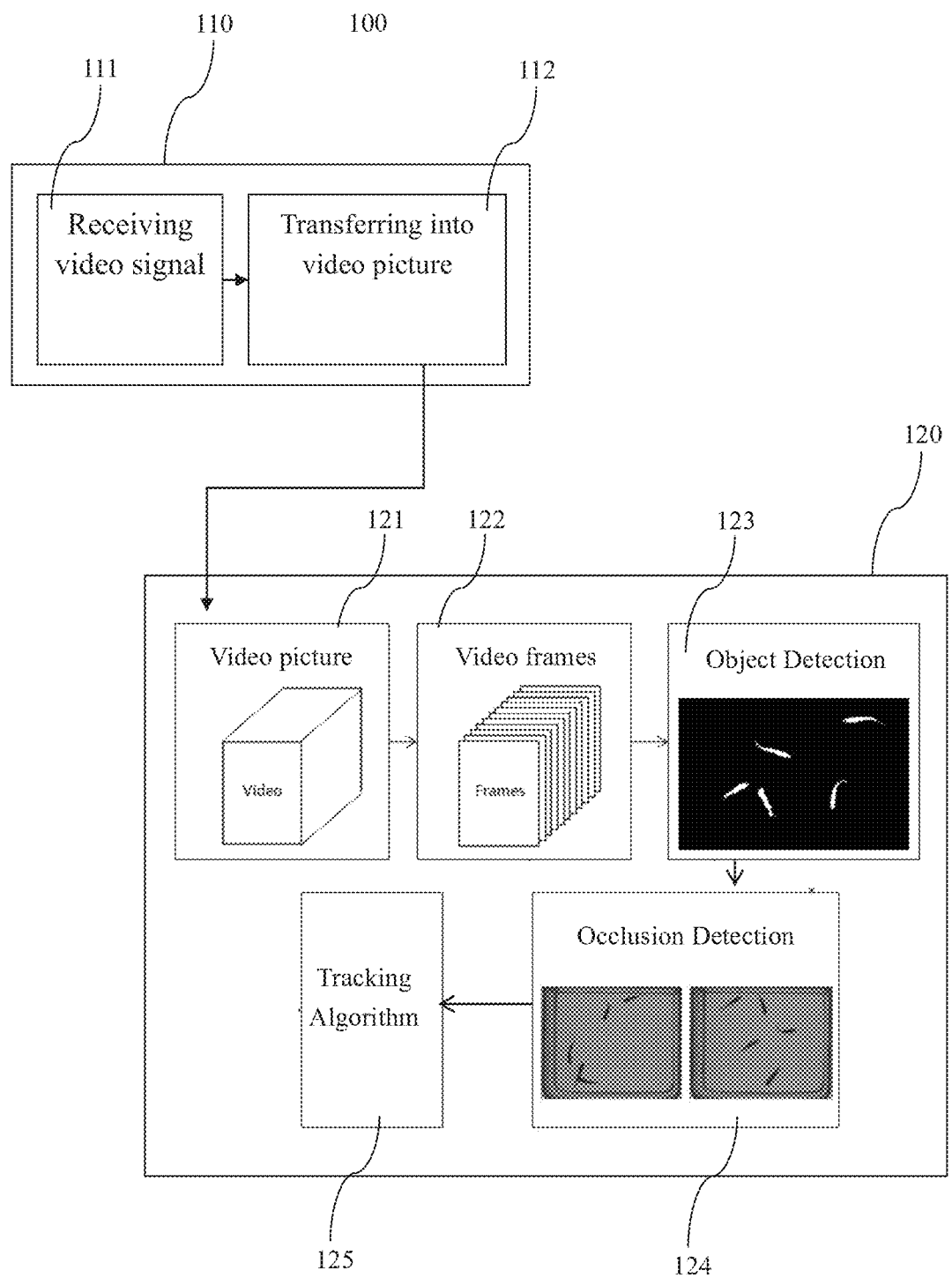
FIG. 1 is a block diagram of one exemplary system configurable to track the moving characteristics of at least two moving objects according to one embodiment of the present invention.

The present invention provides a method for tracking moving characteristics of at least two moving objects, comprising:
(a) providing a video picture of the at least two moving objects;
(b) transforming the video picture into a plurality of video frames;
(c) identifying if there is an occlusion(s) of the at least two moving objects on the video frames;
(d) if no, identifying and recording a position respectively of the at least two moving objects on the video frames;
(e) if yes, locating a non-occluded endpoint(s) of a physical framework(s) of the moving objects in both an occluded situation and a non-occluded situation on the video frames, and then performing the following steps:
(e1) identifying and recording position(s) of the non-occluded moving object(s) on the video frames;
(e2) creating a distance map of the endpoints of the occluded moving objects based on a Euclidean distance and a turn direction of the endpoints of the occluded moving objects on the video frames;
(e3) comparing between the endpoints of the physical frameworks of the occluded moving objects on occlusive video frames and the endpoints of the physical frameworks of the occluded moving objects on previous video frames by using the distant map;
(e4) finding a match endpoints of the occluded moving object(s) on the previous video frames;
(e5) extrapolating an information of the physical framework(s) of the occluded moving object(s) on the video frames;
(e6) interpolating the position(s) of the occluded moving object(s) on the video frames; and
(e7) recording the position(s) of the occluded moving object(s); and
(f) tracking the moving characteristics of the at least two moving objects on the video frames.

The present invention also provides a method for tracking the moving characteristics of behaviors of living bodies.

The present invention further provides a device for tracking moving characteristics of at least two moving objects, comprising means for receiving a video signal(s) of the moving objects and transferring the video signal(s) into a video picture and means for identifying an occlusive condition(s) of the moving objects on a video frame(s), analyzing information of a physical framework(s) of moving objects, finding and recording a position(s) of the occluded moving object(s) on the video frames and tracking a moving character(s) of the moving objects.

DETAILED DESCRIPTION OF THE INVENTION

There are strong needs for devices and methods for automating the measurements of the experiments mentioned above, detecting the occlusion conditions on the video frames, identifying the correct positions of moving objects and providing an efficient measurement results for tracking multiple moving objects.

The term "transforming video pictures into video frames" used herein, unless otherwise indicated, means transforming a video picture from video format into frames format, wherein the video format includes but not limited to special video format.

The term "moving object" used herein, unless otherwise indicated, means an object with a moving character(s), wherein the moving objects include but are not limited to balls, motor machines and/or living bodies, wherein the living bodies include but is not limited to fly, fish mammals, birds, and/or human.

The term "occlusion" used herein, unless otherwise indicated, means an object or a part of an object is not visible from a certain viewpoint. The hidden part of the object may be hidden by any kinds of object.

The term "physical framework(s)" used herein, unless otherwise indicated, means the main structure of the moving object. For example, the physical framework(s) is a skeleton(s), if the moving object is living bodies.

The term "endpoints" used herein, unless otherwise indicated, means the terminal point(s) on the physical framework(s) of the moving object. The endpoints further comprise head point(s) and tail point(s), wherein the endpoint(s) with a forwardly moving direction is a head point(s) otherwise the endpoint(s) is a tail point(s).

The term "distance map" used herein, unless otherwise indicated, means a map for showing the geometrical information of the physical framework(s) of the moving objects, wherein the geometrical information contains locations and turn directions of the endpoints, even the head points and tail points, of the physical framework(s).

The term "Euclidean distance" used herein, unless otherwise indicated, means the ordinary distance between two points.

The term "Pixel" used herein, unless otherwise indicated, means a single point in a raster image on a picture, an image and/or a frame.

An aspect of the present invention provides a method for tracking moving characteristics of at least two moving objects, comprising:
(a) providing a video picture of the at least two moving objects;
(b) transforming the video picture into a plurality of video frames;
(c) identifying if there is an occlusion(s) of the at least two moving objects on the video frames;
(d) if no, identifying and recording a position respectively of the at least two moving objects on the video frames;
(e) if yes, locating a non-occluded endpoint(s) of a physical framework(s) of the moving objects in both an occluded situation and a non-occluded situation on the video frames, and then performing the following steps:
   (e1) identifying and recording position(s) of the non-occluded moving object(s) on the video frames;
   (e2) creating a distance map of the endpoints of the occluded moving objects based on a Euclidean distance and a turn direction of the endpoints of the occluded moving objects on the video frames;
   (e3) comparing between the endpoints of the physical frameworks of the occluded moving objects on occlusive video frames and the endpoints of the physical frameworks of the occluded moving objects on previous video frames by using the distant map;
   (e4) finding a match endpoints of the occluded moving object(s) on the previous video frames;
   (e5) extrapolating an information of the physical framework(s) of the occluded moving object(s) on the video frames;
   (e6) interpolating the position(s) of the occluded moving object(s) on the video frames; and
   (e7) recording the position(s) of the occluded moving object(s); and
(f) tracking the moving characteristics of the at least two moving objects on the video frames.

In some embodiments of the present invention, the position(s) comprises a centroid(s) and an endpoint(s). In some embodiments, wherein each of the endpoints further comprises a head point(s) and a tail point(s)

In some preferred embodiments of the present invention, wherein the match endpoints comprise endpoints with the smallest Euclidean distance or a similar turn direction on the previous video frame.

In some preferred embodiments of the present invention, the information of the physical framework(s) comprises a vector, centroid, endpoint, turning angle, turning direction, speed, length and location.

In some preferred embodiments of the present invention, wherein the moving characteristics comprise paths, staying time, poses, centroids, endpoints, turning angles, turning frequency, rolling frequency, turning directions, speed, length and locations.

In some embodiment of the present invention, the moving objects are including but not limited to balls, motor machines and living bodies. In some preferred present embodiments, the living bodies are including but not limited to fly, fish, mammals, birds, and human. In certain preferred embodiments, the fish is zebrafish. Still in certain preferred embodiments, the mammals is mice, rats, monkey, rabbit and human.

One aspect of the present invention provides a device for tracking moving characteristics of at least two moving objects, comprising:
(a) means for receiving a video signal(s) of the moving objects and transferring the video signal(s) into a video picture; and
(b) means for identifying an occlusive condition(s) of the moving objects on a video frame(s), analyzing information of a physical framework(s) of the moving objects, finding and recording a position(s) of the occluded moving object(s) on the video frames and tracking a moving character(s) of the moving objects.

In one preferred embodiments illustrated in FIG. 1, the invention includes a device 100 for tracking moving characteristics of at least two moving objects, comprising means 110 and mean 120. The means 110 contains a unit 111 for receiving a video signal(s) of the moving objects and a unit 112 for transferring the video signal(s) into a video picture. In some preferred embodiments, the means 110 may be, for example, a video recorder, a motion video camera and/or a digital camera.

The video picture received by means 110 is received by the means 120. The means 120 further comprises a unit 121 for receiving the video picture recorded by means 110, a unit 122 for transforming the video picture into video frames, a unit 123 for detecting moving objects on the video frames, a unit 124 for identifying an occlusive condition(s) of the moving objects on a video frame(s) and a unit 125 for performing a tracking algorithm for analyzing information of a physical framework(s) of the moving objects, finding and recording a position(s) of the occluded moving object(s) on the video frames and tracking a moving character(s) of the moving objects.

In some preferred embodiments of the present invention, the means 120 further comprises, for example, a processor and/or a computer, a custom software program(s) and an analyzing algorithm(s), wherein the processor and/or computer is loaded and configured with custom soft ware program(s) (or equipped with firmware) using, for example, MATLAB or C/C++ programming language, so as to perform the analyzing algorithm(s) and analyze the video picture for tracking moving objects.

In certain preferred embodiments of the present invention, the processor and/or computer is loaded and configured with the custom software program(s) and the custom software program(s) is used to perform the algorithm(s) to identify an occlusive condition(s) of the moving objects on a video frame(s), analyze information of a physical framework(s) of the moving objects, find and record a position(s) of the occluded moving object(s) on the video frames and tracking a moving character(s) of the moving objects.

Figure 2:
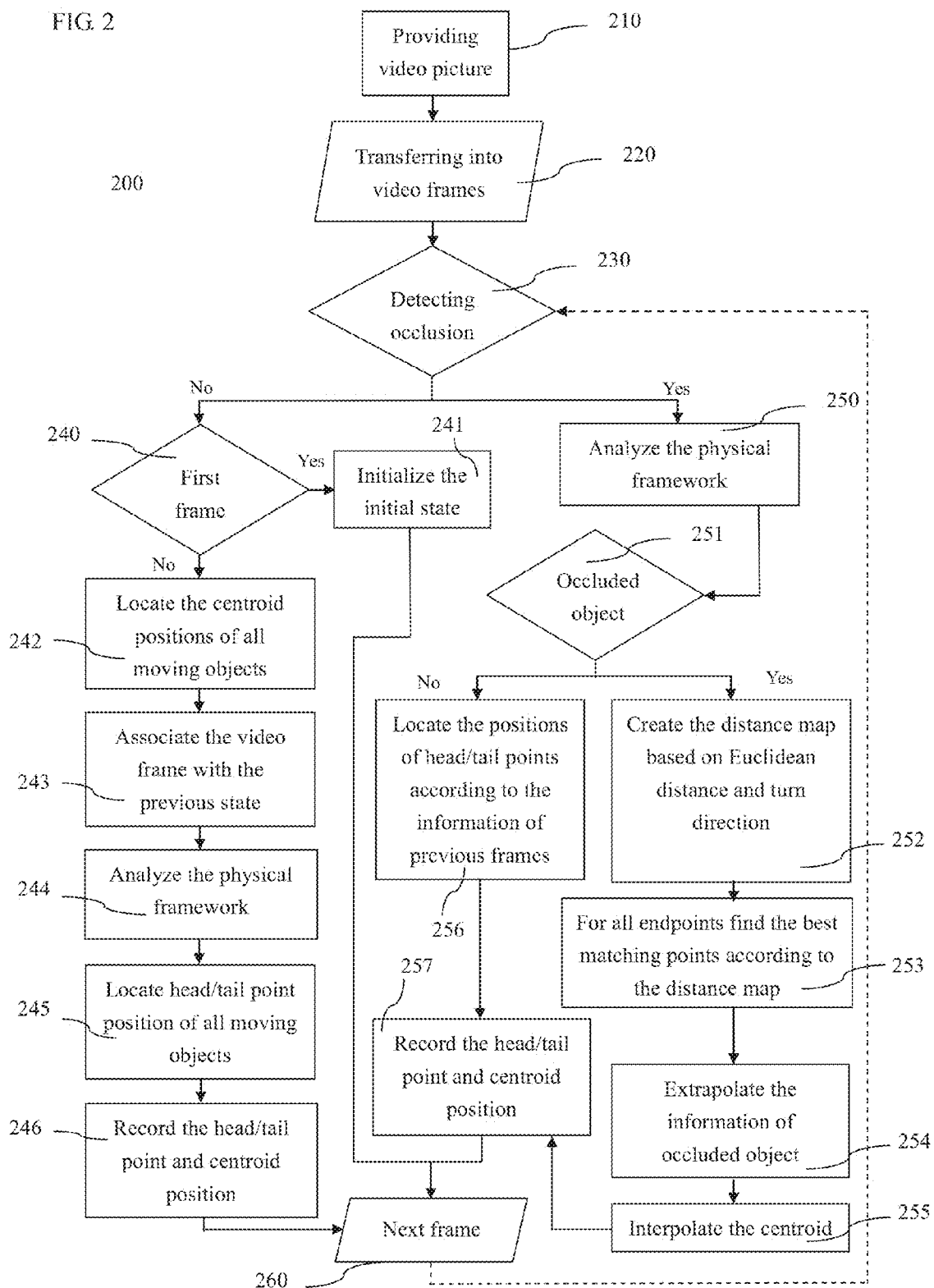
FIG. 2 is a flow chart of a method for tracking moving characteristics of at least two moving objects, according to one embodiment of the present invention.

Referring to FIG. 2, a general method 200 of operating for one embodiment of the invention is described. In operation, in the moving characteristics tracking mode the device receives a video picture of the at least two moving objects at step 210. Then, at step 220, the video picture is transformed into a plurality of video frames. After the video frames are prepared, at step 230, the device detects if there are any occlusive condition of the moving objects on those video frames.

If there have no occlusive condition of the moving objects on the video frames, at step 240, the device further checks whether the video frame is the first frame of the video picture. If yes, at step 241, the device initializes the initial state of the tracking algorithm. If no, at step 242, the device locates the centroid positions of all moving objects on the video frames, and, at step 243, associates the video frame with the previous state. After that, at step 244, the device analyzes the physical frameworks of all moving object on the video frames. Then, at step 245, the positions of head/tail points of all moving objects on the video frames are located, and, at step 246, the head/tail points and centroid positions of the moving object on the video frames are recorded. After all the procedure described above, at step 260, the device starts to analyze the next frame and the procedure restarts from step 230.

On the other hand, if there have an occlusive condition(s) of the moving objects on the video frames, at step 250, the device analyzes the physical frameworks of all moving objects on the video frames. Then, at step analyze the physical frameworks of all moving objects on the video frames. Then, at step 251, the device further checks whether the moving object on the video frames is an occluded object. If no, at step 256, the device locates the head/tail point according to the information of previous frames and, at step 257, the head/tail points and centroid positions of the moving object on the video frames are recorded. If yes, at step 252, the device creates the distance map based on the Euclidean distance and turn direction of the moving object on the video frames. Next, at step 253, the device finds a match endpoint of the occluded moving object(s) according to the distance map on the previous video frames. After that, at step 254, the device extrapolates the information of the occluded information and, at step 255, interpolates the centroid of the occluded object. Then, at step 257, and the head/tail points and centroid positions of the occluded object on the video frames are recorded. After all the procedure described above, at step 360, the device starts to analyze the next frame and the procedure restarts from step 230.

EXAMPLES

The examples below are non-limiting and are merely representative of various aspects and features of the present invention.

Example 1

The presenting example used zebrafish as a model for performing the individual tracking method and device of present invention. The present invention is not limited to be used in tracking zebrafish or fish.

I. Object Detection

The background of the video picture did not have any substantial movement and the illumination. The video signal of the back ground of the whole video picture was stable, so the grey value of the background was also stable under the fixed illumination.

This property of background works was similar to the reflectance image in WEISS, Y. 2001. "Deriving intrinsic images from image sequences" (In International Conference On Computer Vision (ICCV 01), 68-75). The present invention reconstructed the background image by using the following formula:

$$b(x,y) = \text{mod}\left[(I_i(x,y))_{i=1 \ldots \text{Number of total frames}}\right] \quad (1.1)$$

wherein b(x,y) was the background grey level, I(x,y) was the grey value of i-th frame and x,y was the coordinate of the image, mod was a function that extracts the most frequently occurring value in the image sequence. The reconstructed background was shown in FIG. 3(*a*).

The binary map Binary$_i$(x,y) of the foreground object in the i-th frame was extracted by the following formula:

$$\text{Binary}_i(x, y) = \begin{cases} 1 \text{ (Foreground);} & \text{if } I_i(x, y) - b(x, y) \geq \text{threshold} \\ 0 \text{ (Background);} & \text{if } I_i(x, y) - b(x, y) < \text{threshold} \end{cases} \quad (1.2)$$

The threshold in formula 1.2 was assigned by user, which controlled the minuteness of the binary map. The binary map of the foreground objects was shown in FIG. 3(*b*).

II. Occlusion Detection

In order to achieve the aim of occlusion detection, some prior information was needed. The first was how many fish (N) were going to be tracked; the second was the area (R). By utilizing N and R as inputted of occlusion detecting device, the present invention could obtain the number of blocks inside the area (N$_i$) then compared the N$_i$ with the number of tracking fish (N); the frames could have two judgments: "occlusion frame" or "non-occlusion frame".

For example, the parameters (N, R, N$_i$) in FIG. 4(*a*), a non-occlusion frame, the N was 5, N$_i$ was 5 and R was the area inside the rectangle. On the other hand, the parameters (N, R, N$_i$) in FIG. 4(*b*), an occlusion frame, the N was 5, N$_i$ was 4 and R was the area inside the rectangle. Therefore, in non-occlusive situation, the number of tracking fish was equal to the number of blocks in the area. On the other hand, if occlusive situation, the number of tracking fish was more than the number of blocks in the area.

In FIG. 5, there were 5 fish in this tank and two of them were occluded as an arrow points out. If it only considered the number of blocks N$_i$ inside the rectangle (FIG. 5*b*, the rectangle of dotted line), this frame was an occlusion frame. But if it both took inside and outside of the rectangle in account, N$_i$ was equal to the number of tracking fish, leaded to a detection mistake.

III. Locating Centroid

Calculating the centroid of an area involved the geometrical shape of the area. The following formula showed how to calculate of the centroid:

$$A = \int f(x, y) dx dy; \quad C_x = \frac{\int x dA}{A}; \quad C_y = \frac{\int y dA}{A} \quad (3.1)$$

Figure 6:
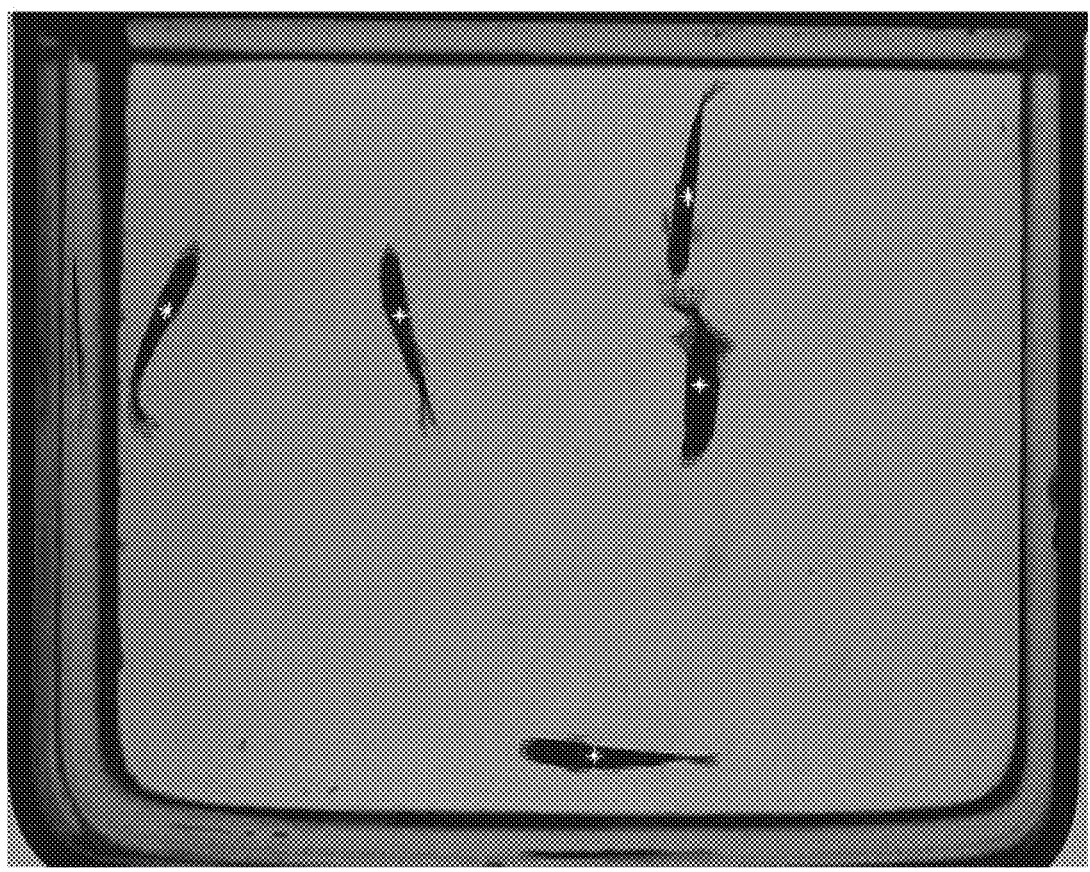
FIG. 6 shows the centroid locating result of the moving objects on a video frame, wherein the * denotes the centroid.

The $\chi$ and y were the coordinates, the distance from the y-axis to the centroid was $C_x$; the distance from the y-axis to the centroid was $C_y$; and the coordinates of the centroid were ($C_x$, $C_y$). In program implementation, A was the total number of pixels of an object. It was similar to the area of a 2D object. In every frame of the input video the present invention located the centroid for the N tracking objects, except the occlusion frames. The FIG. 6 showed the centroid locating result.

VI. Morphological Image Processing

The morphological image processing was erosion, dilation, opening and closing. Because of the distortion of video compression on the tail and fin of fish, it was necessary to remove the noise on the video frames to obtain the binary map by using opening. The erosion set A by set B could be denoted by $A \ominus B$ and defined as:

$$A \ominus B = \{x : B_x \subset A\} \quad (4.1)$$

$$B_x = \{b + x : b \in B\} \quad (4.2),$$

wherein $\subset$ was the subset relation and $B_x$ was the translation of set B by a point x. Briefly, the erosion contains of all scanning location where the structuring element fitted inside the image. The dual operation of erosion was dilation. The dilation of set A by set B could be denoted by A⊕B and defined as:

$$A \oplus B = (A^c \ominus \check{B})^c \quad (4.3)$$

wherein $A^c$ was the complement set of A and $\check{B}$ was the reflection of B (a 180° rotation about the origin). If the erosion represented a filtering on the inside then dilation must be filtering in the outside. Based on erosion and dilation, the opening of an image A by a structuring element B was denoted by A∘B and defined as:

$$A \circ B = (A \ominus B) \oplus B \quad (4.4)$$

Referring to FIG. 7, the original binary map of video frame was showed in FIG. 7(a) and the binary map after opening was showed in FIG. 7(b).

V. Thinning

Figure 8:
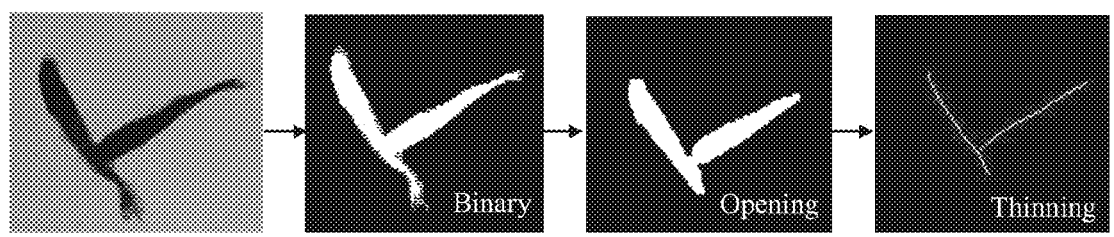
FIG. 8 shows the overall flow chart for extracting the skeleton of the fish on a video frame.

The present invention selected the "Bwmorph" function of custom soft ware program, MATLAB, directly to perform the thinning work. The thinning procedure was summarized in FIG. 8.

VI. Information of Physical Frameworks

The physical framework of fish was the skeleton. The present invention obtained the fish skeleton using the thinning algorithm. For the purpose of the following analyzing algorithm, some information from the skeleton was needed to be extracted.

Figure 9:
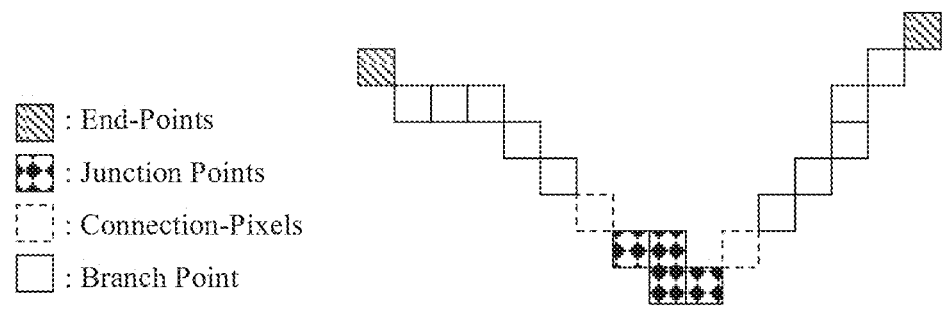
FIG. 9 shows the information of the physical frameworks of the moving objects.

FIG. 9 showed the information which was extracted from a skeleton. As illustrated in FIG. 9, the needed information: end-point, junction points, connection-pixels and branch point could be extracted by the following rule (Nikzad Babaii Rizvandi, Aleksandra Pi_zurica, Filip Rooms, Wilfried Philips, "Skeleton analysis of population images for detection of isolated and overlapped nematode *C. elegans*", 16th European Signal Processing Conference (EUSIPCO 2008), Lausanne, Switzerland, Aug. 25-29, 2008, copyright by EURASIP.):

End-Points: Pixels inside the skeleton with only one neighbor.

Junction Points: Pixels inside the skeleton with more than two neighbors.

Connection-Points: Pixels inside the skeleton with only one neighbor after removing the junction-pixels.

Branch Points: The pixels except the three types mentioned above.

In addition to these points, the type of intersection points was extracted from the skeleton as well. It was reasonable to obtain the intersection point by finding the junction pixel that had the most neighbors.

VII. Physical Frameworks Analysis Method

The present invention provided the algorithm based on two types of frames "Non-occlusion frame" and "Occlusion frame".

The symbols used in following example were summarized below:

i: The i-th frame of the input video.
N: The number of total tracking fish.
n: The n-th fish of total N tracking fish.
$C_i$: The centroid coordinates of i-th frame.
$X_i$: The state of i-th frame, if i equal to 1 it represented the initial state.
E(x, y): The Euclidean distance of point x and point y.

i. The Basic Tracking Method

At the first frame, by locating the centroid position of all fish, the present invention assigned initial states to these target objects, likes giving names to them. But at the next frame, in order to track individually, the present invention must match the corresponding relationship between frames. Because the frame rate of the shooting camera was high enough to catch the swimming movement of fish, the present invention could assign the current state based on the related centroid variations.

Suppose the state of fish was $X_i$, wherein $X_i$ was state vector that represented N kinds of states. For the previous frame i−1 and current frame i, the centroid distance between the fish was denoted by D and defined as:

$$D_{pq} = E(C_{ip}, C_{(i-1)q}), \text{ for } p,q=1 \sim N \quad (7.1),$$

wherein D was N by N matrix that represented the centroid displacement of the fish between two frames.

The actual current state $X_i$ could be obtained by comparing with the previous state $X_{i-1}$. Clearly, for the uncertain state of the current frame, the actual state could be confirmed by finding the minimum displacement in distance map D. The minimum displacement represented the most related in geometrical relation. For example, suppose N was 5, the distance map was a 5 by 5 matrix as shown in FIG. 10. The previous state 1 which was the first column of distance map, the corresponding minimum was at state c, so the real state of c was state 1. Repeated this step column by column then the actual state of the current frame would be confirmed.

Figure 11:
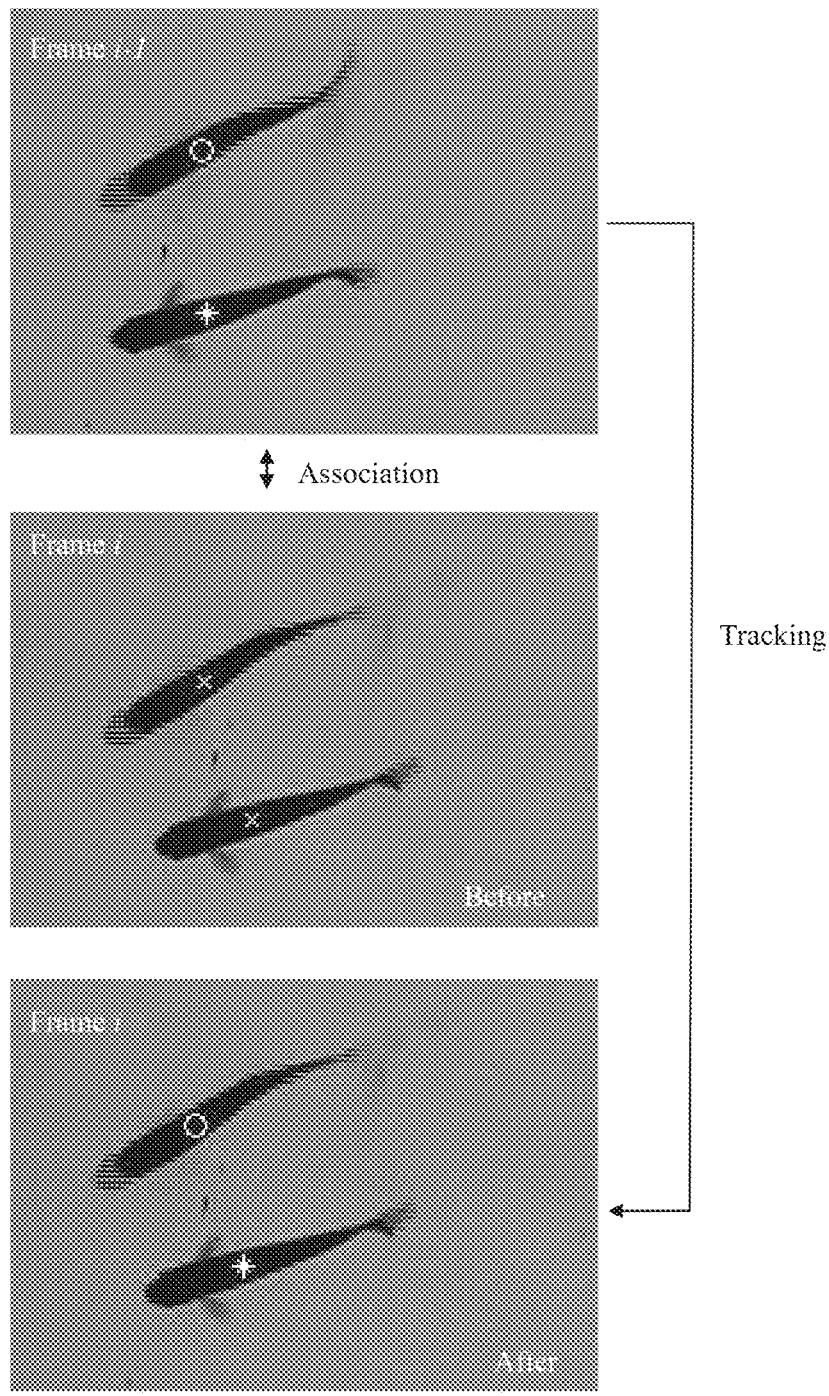
FIG. 11 shows the association process of two sequential video frames, wherein the ○, * and x denote the centroid.

From the viewpoint of program implementation, the state of a frame means the association of the first frame to give names to fish such as yellow fish, green fish etc. or No. 1-fish, No. 2-fish etc. At the next frame, the present invention kept tracking these fish, which had different variation in location. For every input frame the device just computed the N centroid positions, without recognizing them. Therefore, created the distance map and compared the geometrical position of each fish with previous state may assign the exact state for these fish. To sum up, overall conception could be schematized in FIG. 11.

If one state was assigned multiple times as shown in FIG. 12(a), by checking the minimum of each column in the distance map, it observed that state A was multiple assigned to state R, state G and state B at the same time.

For this situation, the present invention double checked the minimum value of state A which was the first row of the distance map. The minimum of the first row was located at state R so obviously the actual state of A was state R. Meanwhile the other wrong minimums of state A were modified by an infinity value as shown in FIG. 12(b). Restart found the minimum of each columns, the actual state could be confirmed correctly.

ii. Tracking in Non-occlusion Frames

Basically, the tracking method used for tracking non-occlusion frames here was the same as the basic tracking method. Furthermore, for tracking non-occlusion frames, the positions of fish head and tail were important reference information for the occlusion separating method. Therefore the present invention located the head and tail points of all fish first.

Figure 13:
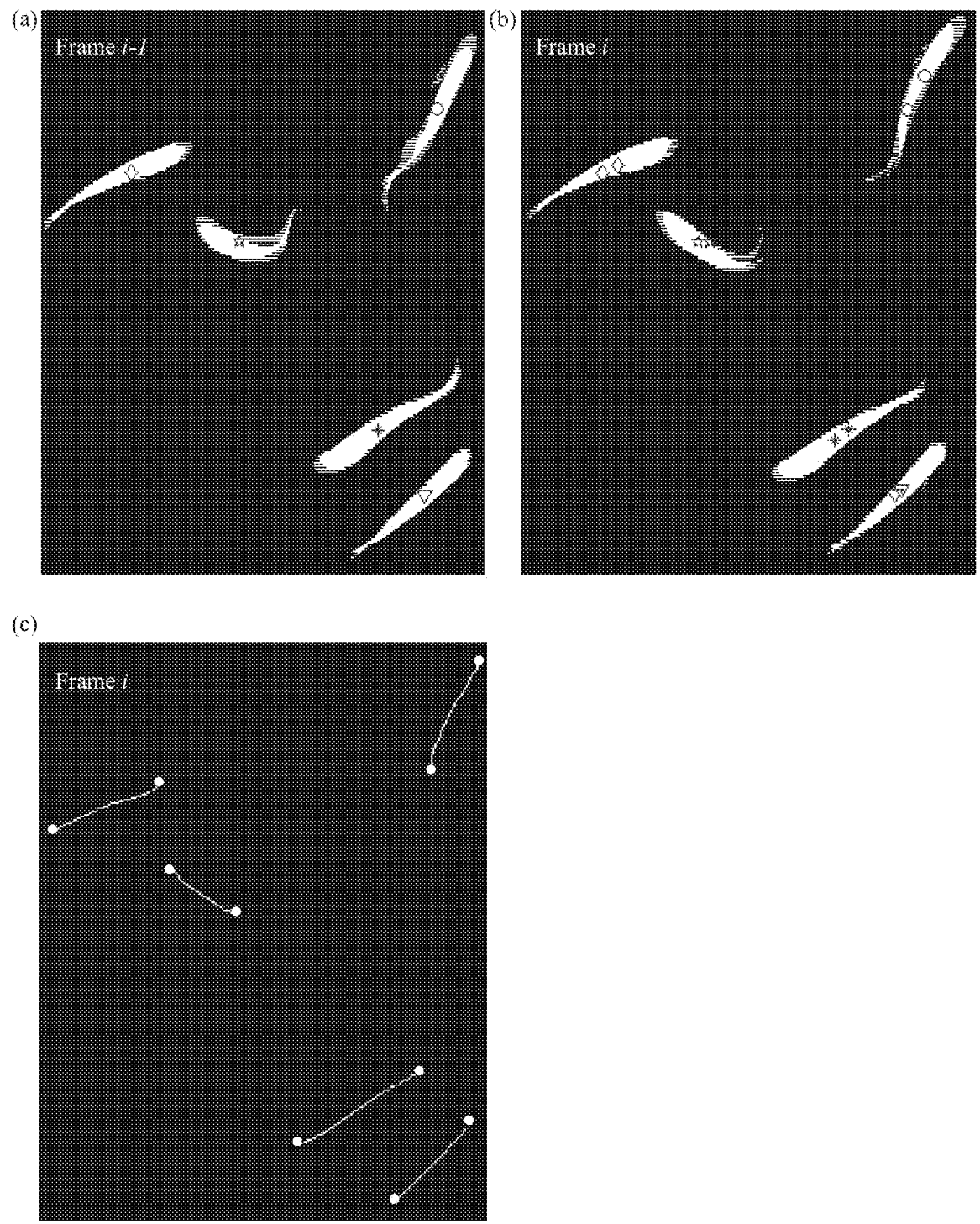
FIG. 13 (a) (b) shows the tracking result of two sequential video frames, wherein the ▽, *, ☆, ○ and ◇ denote the centroid, and (c) shows the thinning result of the moving objects on FIG. 13(b)

FIG. 13(a) and FIG. 13(b) showed the tracking result obtained from the basic tracking method. FIG. 13(c) showed the thinning result of FIG. 13(b), the dotted points in FIG. 3.7(c) were the endpoints of skeletons.

In order to characterize fish by three points: head, tail and centroid instead of only one point: centroid, it was needed to link these head and tail points to fish. It could be performed by two steps:

Step 1: Endpoints that belong to one fish were allocated to the same class. The number of classes depended on the number of fish.

Step 2: For points in one class, distinguished which point was head and which was tail.

Step 1 could be achieved from the binary map, since the head, tail and centroid of a fish must be in the same block. Therefore, the points which lies in the same block was been recognized as centroid, then the end-points could also been classified into N classes, as shown in FIG. 14(a).

Step 2 was concentrate on analyzing points in the same class. The point in the same direction of swimming path was head and in the opposite direction was tail. The result was shown in FIG. 14(b), wherein the "circle" denoted head and the "triangle" denoted tail.

The head and tail could not be located on the first frame. Because there were only the centroid position and the initial state in the first frame, the swimming direction of individual fish could not be obtained from there. Thus, the head and tail points could be located with more than two video frames. The head, tail and centroid points were recorded for every frame sequence once occlusion occurred and it was useful to analyze the possible centroid locations.

iii. Tracking in Occlusion Frames

First of all, the fish which in the occlusion frame must be classified into two types, one was non-occluded fish and the other was occluded fish, because in an occlusion frame, not all fish were occluded. Distinguish which fish were occluded and which were not was a key idea for the new method. This hierarchically tracking method could simplify the complexity of tracking problem. But there was a question: how to associate them. The method achieved it by analyzing the information that had been recorded in non-occlusion frames.

(1) Occlusion Detection

For the associated centroids which had been located in the previous frame, if two (or more) of them belonged to the same block in the current frame, these fish must be occluded. Referring to FIG. 15, before occlusion all fish could be located individually (FIG. 15(a)), once occlusion occurred (FIG. 15(b)) the centroids of these fish which were pin-pointed by arrows were in the same region. Thereby, it was clearly to notice which fish were occluded and which were non-occluded. Based on different situations of fish, the tracking method had different separating algorithm, which was called hierarchically tracking.

(2) Analyzing the Information of Physical Frameworks

For these occluded fish, because the centroid points were influenced by occluded objects, the centroid could not been located directly. Instead, the present invention used the geometrical relationship to locate head and tail.

For all endpoints that were extracted from the skeleton in the current frame must be close to the head and the tail which had been located in the previous frame. Therefore, the endpoints could be located by finding the minimum variation of Euclidean distance and turn direction from the previous last head/tail points. For example, there are 2 non-occluded fish and n endpoints. The distance map was shown as FIG. 16.

The head/tail points could be located in the current frame by finding the minimum value in distance map. Referring to FIG. 15, for fish 1 the head position in the current frame was the End 3 and for fish 2 was End 1. Following formula showed the construction of distance map:

$$DH_{pq}/DT_{pq} = \underbrace{E(H/T_{(i-1)p}, End_{iq})}_{\text{Euclidean distance}} + \tag{7.2}$$

$$\underbrace{\cos^{-1}\left(\frac{(H/T_{(i-1)p} - H/T_{(i-2)p}) \square (H/T_{(i-1)p} - End_{iq})}{|H/T_{(i-1)p} - H/T_{(i-2)p}||H/T_{(i-1)p} - End_{iq}|}\right)}_{\text{The change of turn direction}}$$

wherein the DH/DT denoted the distance map of head or tail, H/T denoted head or tail points of non-occluded fish, End denoted all the endpoints of non-occluded fish, p denoted 1~number of occluded fish, and q denoted 1~the total number of endpoints.

Once locating head and tail was completed, the current centroid could be obtained by the following formula:

$$C_i = \frac{H_i + T_i}{2}; \ i\text{: current frame,} \tag{7.3}$$

wherein $H_i$ was the current head position and $T_i$ was the current tail position.

Next, focus on the occluded fish of the occlusion frames, the head/tail positions had already been recorded, so it had more information for analyzing the paths of the occluded fish.

(3) Separating the Occluded Fish

Figure 17:
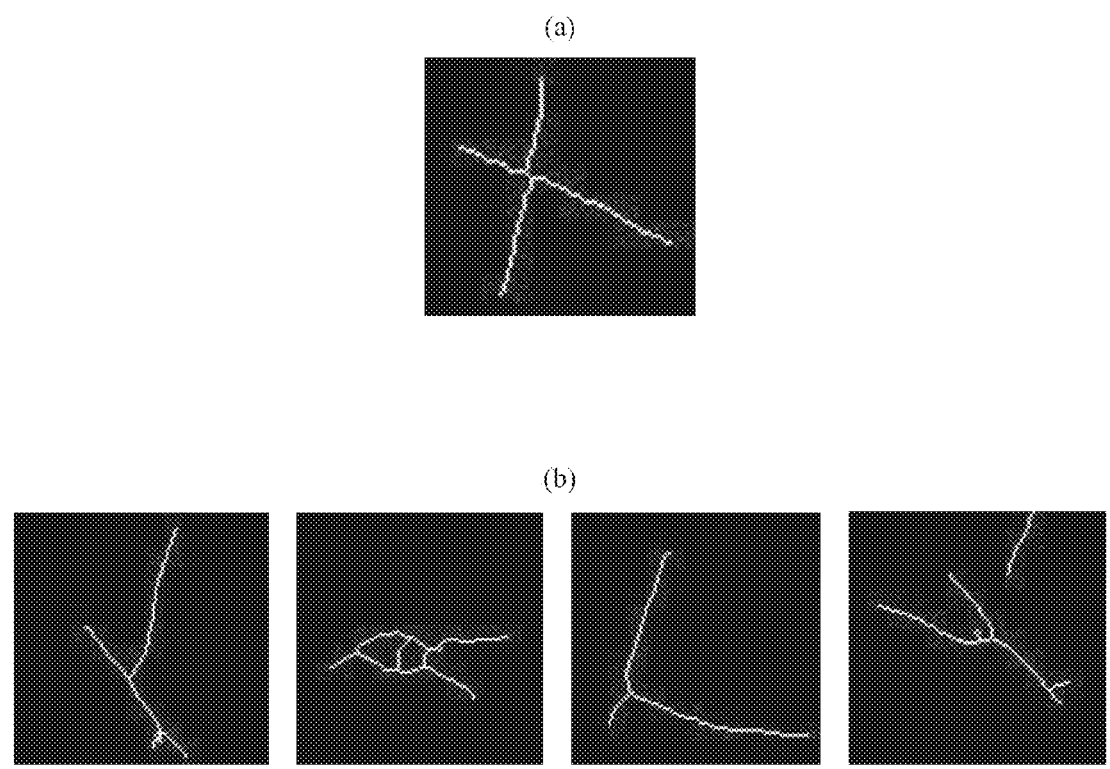
FIG. 17 (a) shows a crossover occlusive skeletons of two occlusive fish on a video frame, (b) shows the bizarre occlusive skeletons of two occlusive fish on a video frame.

For occluded fish, using two fish as example, the ideal crossover skeleton might look like FIG. 17(a), but in fact there were various unexpected skeletons as shown in FIG. 17(b). The method of present invention could not only deal with the ideal cases but also unexpected cases.

First, the presenting example only extracted the endpoints of these skeletons, because it seemed the intersecting points to be noisy points in some unexpected cases. Second, not all the endpoints were needed information, the presenting example removed those which were unwanted. Summarizing all the viewpoints mentioned above, the method could be listed as the following steps:

Step 1: creating the distance map.

Step 2: selecting best matching points by using the distance map.

Step 3: if there was lost information, extrapolating the lost information.

Step 4: interpolating the path/centroid.

Step 1, similar to non-occluded fish, the distance map includes two components, one was the head/tail Euclidean distance between current and previous frames, and the other was the change of turn direction. The formula of distance map could be expressed as:

$$D_{pq} = \underbrace{E(Body_{(i-1)p}, End_{iq})}_{\text{Euclidean distance}} + \tag{7.4}$$

$$\underbrace{\cos^{-1}\left(\frac{(Body_{(i-1)p} - Body_{(i-2)p}) \square (Body_{(i-1)p} - End_{iq})}{|Body_{(i-1)p} - Body_{(i-2)p}||Body_{(i-1)p} - End_{iq}|}\right)}_{\text{The change of turn direction}}$$

wherein Body denoted head and tail points of occluded fish, and End denoted all the endpoints of occluded fish, p denoted 1~2×number of occluded fish, q denoted 1~the total number of endpoints. An example of distance map was showed in FIG. 18(a).

Step 2 was finding the best matching points according to distance map. From all the endpoints which might include noisy points, the best matching head/tail points was selected according to the distance map. Referring to FIG. 18(a), the best matching for occluded fish was found by checking the minimum value of distance map column by column. For example, since the minimum value of End 1 was Head 2, the best matching of End 1 could be justified as Head 2.

If more than two minima were found in a row, in consequence, the real minimum in row direction was needed to be double check. Referring to FIG. 18(b), if the distance of End 5 was smaller than End 3, the End 5 would be chosen to be the best matching point for Tail 1.

By using this comparison method, the present invention ensured finding the correct matching and removing noisy points at the same time. To sum up, the meaning of step 2 was finding the possible body location by comparing with the information of the fish on the previous frames, and the comparison measurement was the variation in position and the turn direction.

Because of occlusion, some information might be hidden. Therefore, the matching point could not been found from the distance map. Once it happened, at step 3, it was needed to extrapolate these lost data by using the information which had been recorded previously. For example if the lost information was tail, the tail point could be extrapolated by the following formula:

$$v_{ht} = T_{(i-1)} - H_{(i-1)}$$

$$T_i = H_i + v_{ht} \tag{7.5}$$

wherein T/H denoted the coordinate of fish tail/head points. $v_{ht}$ was the vector of head to tail. The above extrapolation method was illustrated in FIG. 19(*a*).

After extrapolation, the extrapolated tail point was mapped to the skeleton. Similarly, if the lost information head, the head point could be extrapolated by the following formula:

$$v_{hh} = H_{(i-1)} - H_{(i-2)}$$

$$H_i = H_i + v_{hh} \tag{7.6}$$

wherein H was the coordinate of fish head points. $v_{hh}$ was the vector of head to head. Again, the extrapolated head point was mapped to the skeleton. The above extrapolation method was illustrated in FIG. 19(*b*).

If the lost information were head and tail, it was more complex than the situations mentioned above. In this special case, these two points could be extrapolated by following formula:

$$D_{hc} = |H_{(i-K)} - C_{(i-K)}| \tag{7.7}$$

$$v_{cc} = \frac{C_{(i-1)} - C_{(i-2)}}{|C_{(i-1)} - C_{(i-2)}|}$$

$$H_i = C_{(i-1)} + [(D_{hc} + |v_{cc}|) \times v_{cc}] \tag{7.8}$$

$$T_i = C_{(i-1)} - [(D_{hc} - |v_{cc}|) \times v_{cc}],$$

wherein K in formula 7.7 denoted the number of the occlusion frames in current time, and $v_{cc}$ was a unit vector, $D_{hc}$ was a scalar. The above extrapolation method was illustrated in FIG. 19(*c*).

In step 4, because every occluded fish head/tail points were located, now the centroid could be interpolated by formula 7.3.

The present invention focused more on analyzing the existing information and using it to locate the occluded information. Generally, the physical frameworks analysis method was more reliable than prior art. Furthermore the head/tail location and hierarchical tracking provided more information to improve the tracking efficiency.

VIII. Path Analysis

There were four parameters for quantifying the behavior of fish. These parameters were listed as follows:

Distance index (DI): Total swimming distance (D).

$$DI = \frac{C_D - E_D}{C_D + E_D}; \tag{8.1}$$

Value between 0 and 1.

Turn direction index (TDI): Pick right/left turn counts.

$$TDI = \frac{|E_{right} - E_{left}|}{E_{right} + E_{left}} - \frac{|C_{right} - C_{left}|}{C_{right} + C_{left}}; \tag{8.2}$$

Value between 0 and 1.

Turn angle index (TAI): Pick 101 to 180 degree turn counts (0).

$$TAI = \frac{|C_0 - E_0|}{C_0 + E_0}; \tag{8.3}$$

Value between 0 and 1.

Zebrafish Movement Index (ZMI)

$$ZMI = DI + TDI + TAI \tag{8.4},$$

wherein E represented that of experiment fish and C represents that of control fish. If experiment fish was perfectly matching the control fish, then ZMI was equal to zero.

Figure 22:
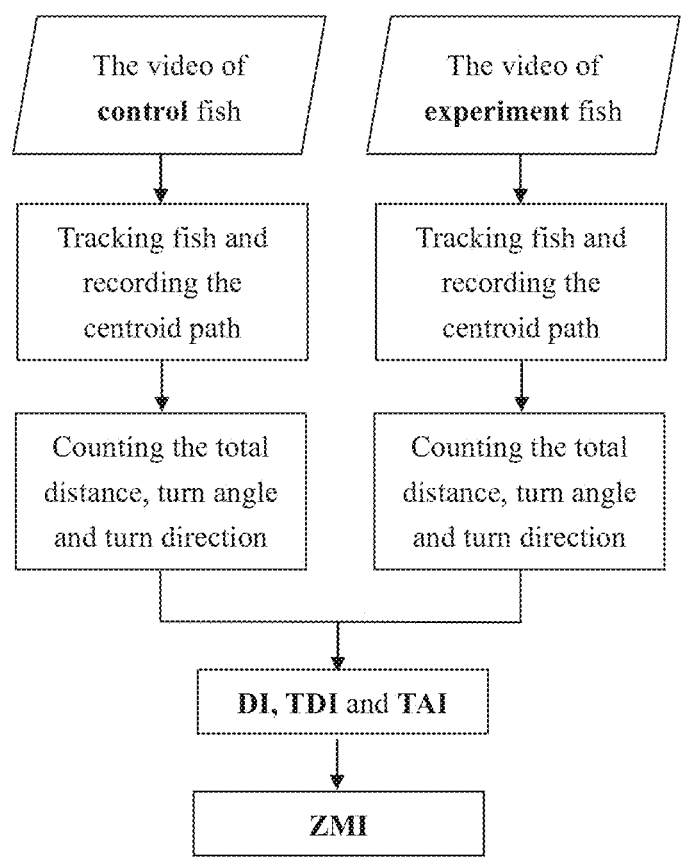
FIG. 22 shows a flow chart of behavior analysis.

The behavior analysis tended to measure the locomotion movement which was hardly obtained from manual observation. Therefore according to the path which had been recorded previously, the distance index (DI) could be obtained by accumulating the swimming displacement of a fish. As for the turn direction index (TDI) and turn angle index (TAI), they could be individually obtained by counting the turn direction (right or left) and the turn angle from the recorded path. The overall behavior analysis procedures could be schematized in the flow chart showed in FIG. 22. The behavior analysis was based on the tracking results.

Figure 23:
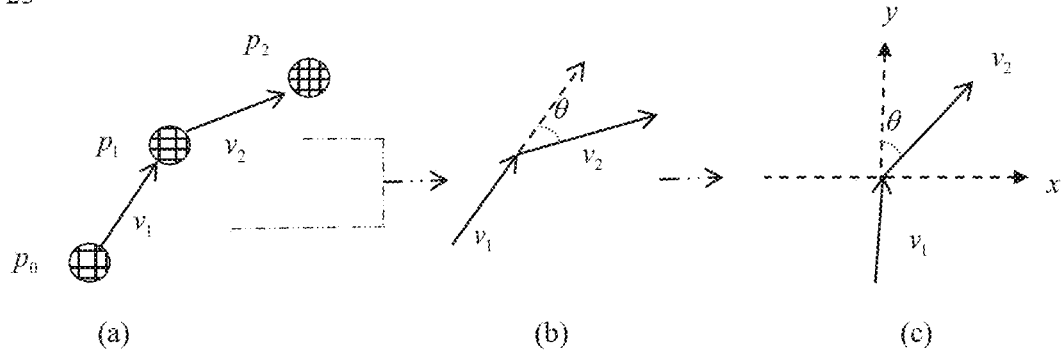
FIG. 23 shows the procedure of the turn angle analysis, wherein the circle is the centroid of moving object, the $p_i$ denotes the centroid position of i-th frame, the $v_i$ denotes the vector of i-th frame and the θ denotes the turn angle.

Referring to FIG. 23(*a*), suppose the circles denoted the centroid positions which were recorded from consecutive frames, two centroid points made a vector and two vectors could form an angle. Therefore, the behavior parameters could be obtained by analyzing the geometric relationship together with the vectors and the angles between these points.

The parameter, DI, could be obtained by counting the total swimming distance. The total displacement could be defined by the following formulas:

$$\text{Total distance} = \sum_{i=2}^{N} \text{Euclidean}(p_i, p_{i-1}) \tag{8.5}$$

or $$\text{Total distance} = \sum_{i=1}^{N-1} |v_i|,$$

wherein N denoted the total number of points and $p_i$ denoted the centroid position of i-th frame. Then the turn angle could be obtained from two adjacent vectors. Referring to FIG. 23(*b*) which were obtained by removing the circles from FIG. 23(*a*), the presenting example put $v_1$ next to the $v_0$ (The dotted arrow), then the dotted vector and $v_2$ could form the angle θ which was the turn angle. The degree of the turn angle could be obtained by the following formula:

$$\theta = \cos^{-1}\left(\frac{v_i \cdot v_{i-1}}{|v_i||v_{i-1}|}\right), \tag{8.6}$$

wherein i was 2~N−1 and · was dot operator.

The turn direction could be obtained by taking the coordinate axis origin to the junction of adjacent vectors where the y-axis was in the same direction of $v_1$ as shown in FIG. 23 (c), then project $v_2$ to the x-axis. If the projection vector was in the positive x-axis direction, it was right-turn, in contrast if the projection vector was in the negative x-axis it was left-turn. The judgment could be formulated as follows:

$$v_2 \cdot \vec{x} = \begin{cases} > 0; & \text{turn right} \\ < 0; & \text{turn left,} \end{cases} \quad (8.7)$$

wherein $\vec{x}$ denoted a unit vector in the x-axis direction and · denoted dot operator.

When judging the action was turn or not, a situation should be further considered, referring to FIG. 24(a), although the centroid points were just drifting around, it caused error judgments as well. To solve this problem, the present invention took the displacement into account. According to the real situation that when a fish was drifting, the centroid displacement was few, even less than 1 pixel. So when a turn action was detected, meanwhile the displacement was checked, and if the displacement was less than a threshold, then it must be error detection.

The overall procedure could be formulated as follows:
When a turn is detected and $|v_i|=E(C_{i-1},C_i)$ $$\text{if } \begin{cases} |v_i| > \text{threshold}; & \text{Actual turn} \\ |v_i| < \text{threshold}; & \text{Just a drift,} \end{cases} \quad (8.8)$$

wherein C denoted the centroid positions and E( ) denoted the Euclidean distance of input points.

Besides considering the centroid displacement, the presenting invention also considered about the size of turn angle. Referring FIG. 24(b), the path (three arrows pointed) was a straight path but after turn angle detection, the turn action was detected as shown in FIG. 24(c). In order to avoid the turn detection being too sensitive, the angle which was obtained from two adjacent vectors must be large enough. If the size of turn angle was too small, the present invention could not be regarded that this condition was as a turn action. To summarize, an actual turn action needed two necessary factors: the displacement must be long enough and the turn angle must be large enough.

Example 2

Figure 20:
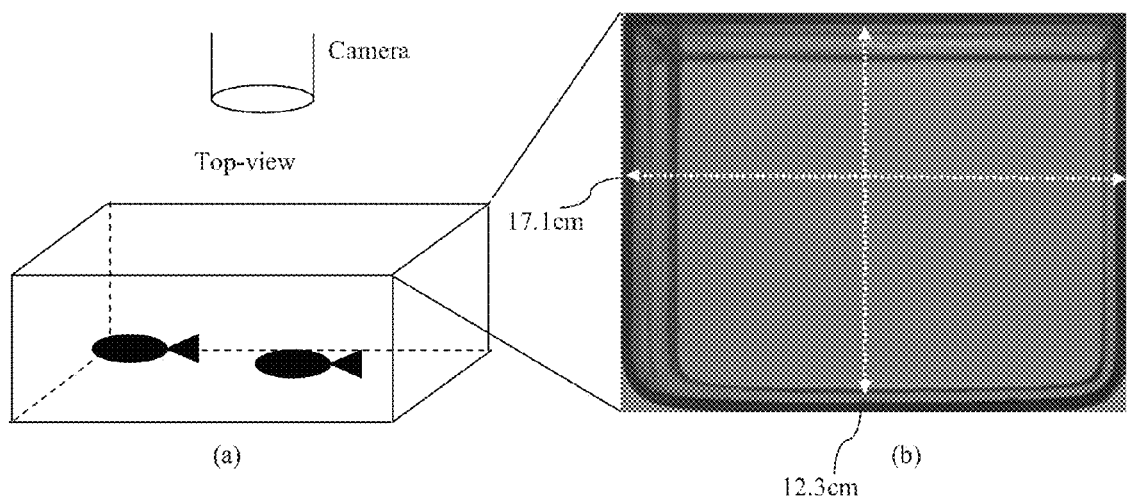
FIG. 20 shows an example of (a) the shooting environment and (b) the size of tank for tracking the moving characteristics of fish.

In presenting example, the tracking environment of input data could be schematized in FIG. 20, in which the camera was capturing the top-view of the tank. The size of tank was always fixed: the inner length was 12.3 cm and width was 17.1 cm.

Each input video was five minutes long and the frame rate was 29 frames per second. So the total number of frames was about 9000. The format of input video picture was in MPEG, and was transformed into a video frames format by a public tool which was provided by MPEG Software Simulation Group, Copyright (C) 1996.

Figure 21A:
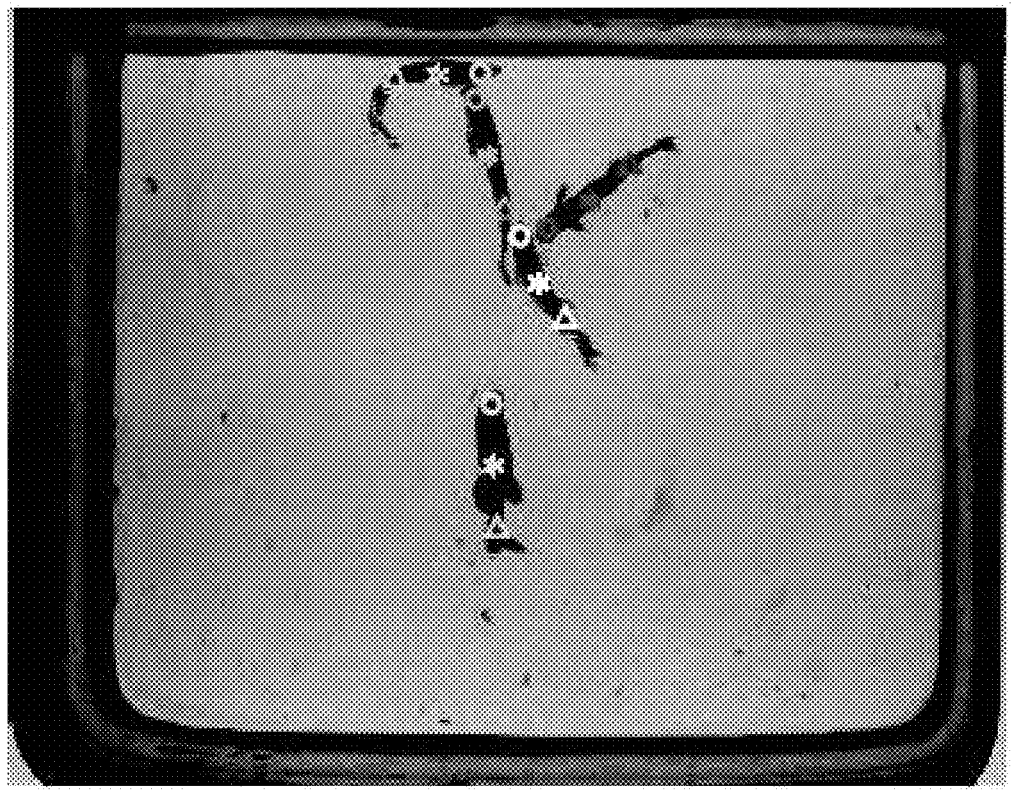
FIG. 21 shows an embodiment of the invention, FIG. 21 (a)~(f) are a serial individually tracking results of the moving characteristics of zebrafish, wherein each zebrafish had been tracked individually and labeled with different color. For all sub-figures in FIG. 21 (a)~(f), ○ denotes head points, Δ denotes tail points and * denotes centroid.
Figure 21:
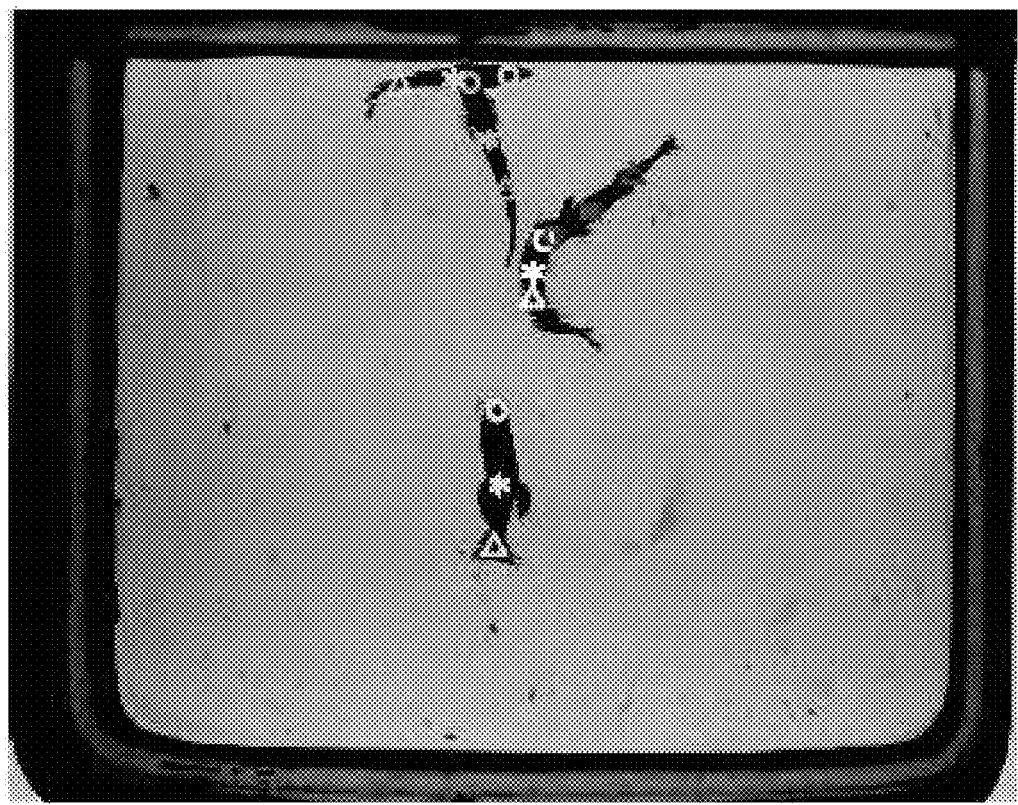
Figure 21C:
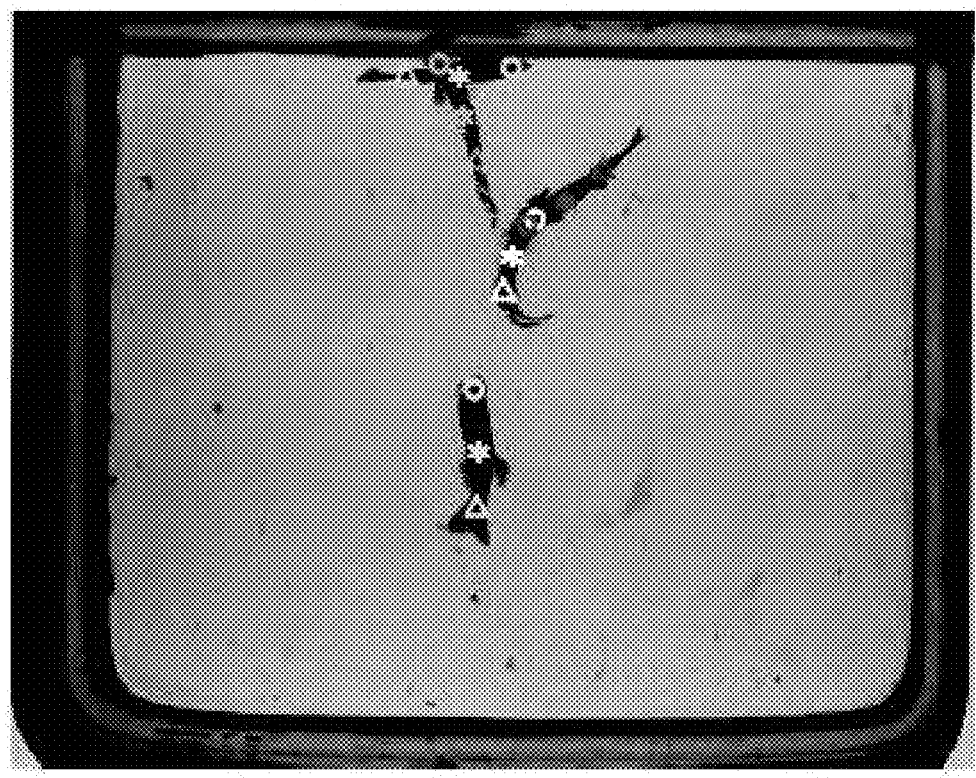
Figure 21D:
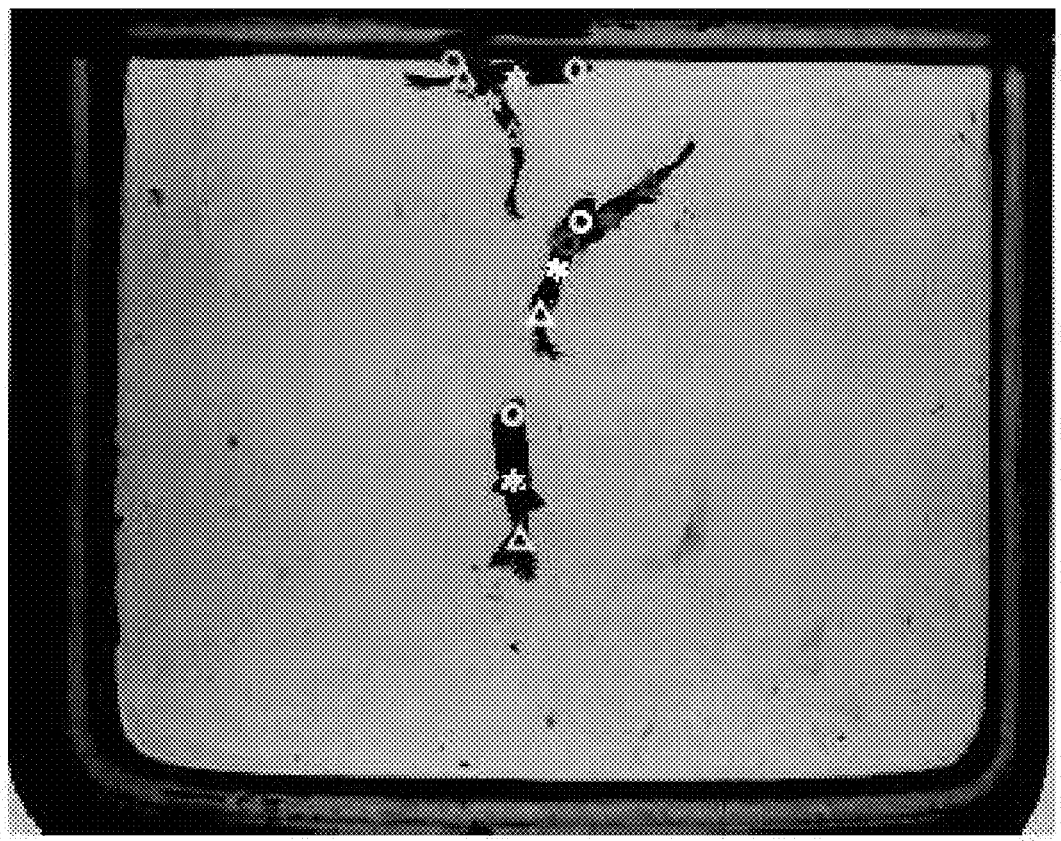
Figure 21E:
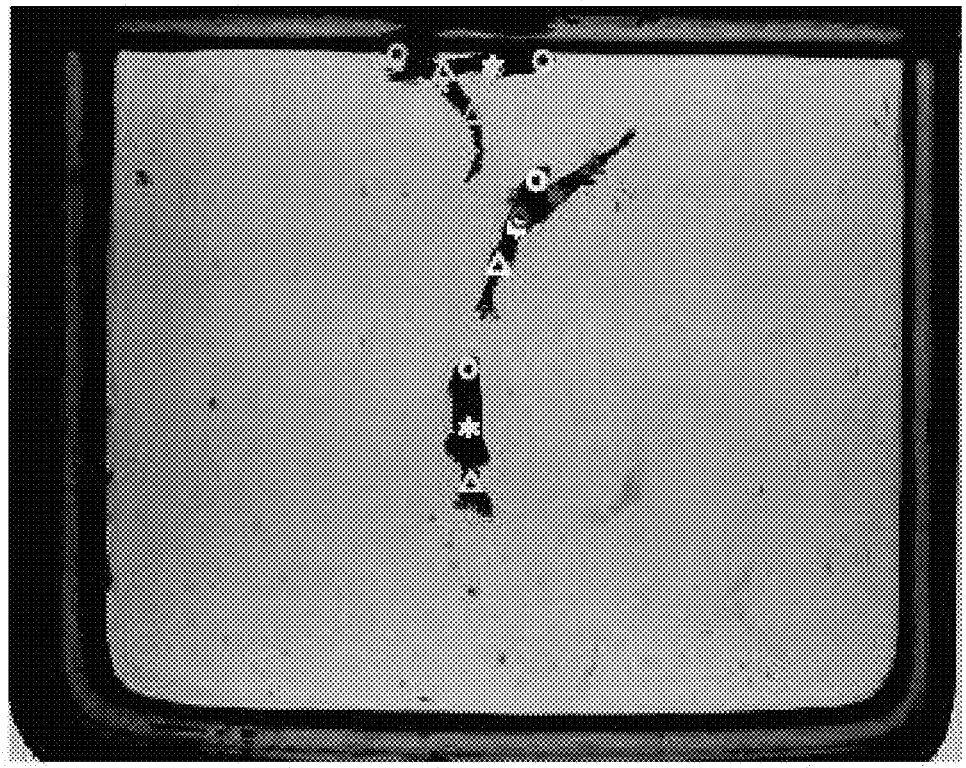
Figure 21:
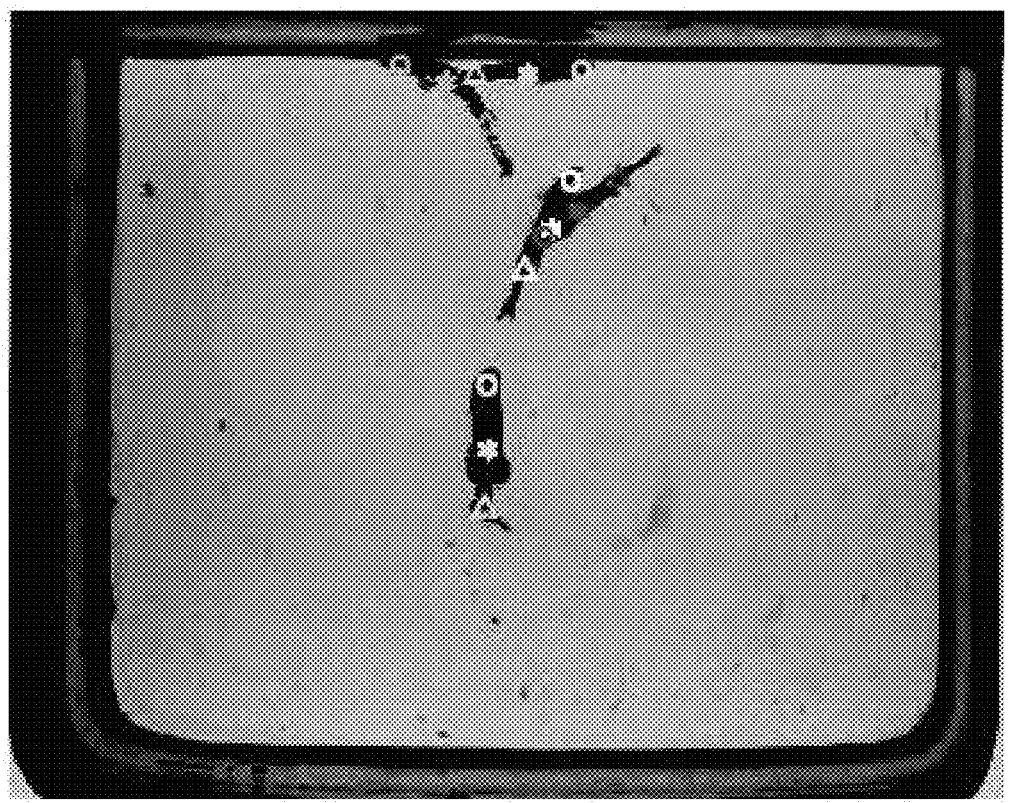

The tracking algorithms presented in presenting example was implemented with MATLAB (Version: R2009a). The simulation device was personal computer with Inter® Core™ 2 Duo CPU E8500 and 4 GB memory. The presenting example used five fish as example and chose representative occlusion to display the separating process. In FIG. 21 (a)~(f), the serial tracking results were shown frame by frame, the presenting example used different colors to represent different fish. The circle symbols in FIG. 21 (a)~(f) denoted head points; the triangle symbols represented tail points and the star symbols denoted centroid points. The window size of the extrapolation method was 5 pixels.

Previously, in prior art, the occlusion situation on the video frames was been analyzed by Experiment method. Referring to S. Kato, et al., "A computer image processing system for quantification of zebrafish behavior" (J Neurosci Meth, 134, 2004), the input videos and the tracking objects are similar to present invention, thus the present example used the parameters which were provided by S. Kato, et al. as a criterion to discuss the tracking accuracy. These three parameters were defined as follows:

$$\begin{cases} \text{occlusion ratio} = \dfrac{\text{total number of occlusions}}{\text{total number of frames}} \\ \text{separation ratio} = \dfrac{\text{successful number of separation}}{\text{total number of occlusions}} \\ \text{recognition ratio of individual fish} = 1 - \text{occlusion ratio} + \\ \quad (\text{occlusion ratio} \times \text{separation ratio}) \end{cases}$$

The occlusion ratio represented the probability of occlusion occurrence in one video and generally increased with the number of fish. The separation ratio represented the most important one, which represented the accuracy of separating algorithm. The recognition ratio of individual fish integrated the separation ratio of non-occlusion frames and occlusion frames. Following tables showed the occlusion ratio, the separation ration and the recognition ratio of individual fish of two algorithms. In these tables, each row represented one input video with n tracking fish.

TABLE 2

The accuracy of two methods

| | Method | Occlusion ratio | Separation ratio | Recognition ratio of individual fish |
|---|---|---|---|---|
| 3 fish | Extrapolation | 4% | 79.5% | 99.2% |
| | Skeleton | 4% | 93% | 99.7% |
| 4 fish | Extrapolation | 11% | 89.1% | 98.8% |
| | Skeleton | 11% | 93% | 99.2% |
| 5 fish | Extrapolation | 32% | 79.8% | 93.5% |
| | Skeleton | 32% | 92.6% | 97.7% |

TABLE 3

The accuracy of skeleton analysis method

| | Occlusion ratio | Separation ratio | Recognition ratio of individual fish |
|---|---|---|---|
| 6 fish | 30.5% | 85% | 95% |
| 7 fish | 42% | 85.2% | 93.8% |
| 8 fish | 51.5% | 84.9% | 92.2% |

Table 2 indicated the occlusion ratio, the separation ration and the recognition ratio of individual fish of two algorithms. The presenting example observed that the occlusion ratio rose with the increase in fish number. For the extrapolation method, the average separation ratio was about 80%. The recognition ratio of individual fish rose with the increase in fish number, especially when the number of tracking objects is five, it drops to 93.5%.

For the extrapolation method, because it was based on an assumption: fish were swimming with a constant velocity during the occlusion, but when two or more fish were crossed, they might interact with each other which caused the velocity of them to be unstable. Therefore this assumption became useless when the number of occluded fish increased.

As for the method in presenting invention, skeleton analysis method, it improved the leakages about occlusion analysis of extrapolation method. Therefore, the average separation ratio was raised to 90%. Compared to the extrapolation method, the skeleton analysis method analyzes the existing information instead of blind extrapolation and the head and tail location helped finding the association more correctly. So it was reasonable that the tracking accuracy of the skeleton analysis method was better than that of extrapolation method.

Table 3 showed the corresponding parameters for tracking more than five fish. In this case, the extrapolation method might cause more tracking errors. Referring to Table 3, the presenting example observed that the occlusion ratio increased rapidly with the increase in fish number. For these cases, the occlusions were too complex to solve so as to cause the decrease in separation ratio. Although the separation ratio dropped to 85%, the average recognition ratio of individual fish still kept at 90%.

Table 4 summarizes the average execution time, the average accuracy, advantages and disadvantages, and Table 5 summarized the average execution time of two separating algorithms. For the execution time, because the skeleton analysis method located more body positions (head and tail) thus cost more time than extrapolation method, but the accuracy increased relatively. Besides, it was unnecessary for the skeleton analysis method to assign the additional parameter (Ex: window size), so it was more roust.

If fish had different colors, some difficult occlusion problems could be solved by using the color information to modify the tracking result. In other words, adding the color information to our input data could simplify the occlusion problems that were difficult currently.

Example 3

The presenting example used two fish as example. There were one input videos for control fish, (a) and (b), and one input videos for experiment fish, (c) and (d). The two videos were tracked individually. First, the presenting example analyzed the control fish which were the healthy fish in this case. The individual path diagrams of the two fish were shown in FIG. 25(a) and FIG. 25(b). The path in the path diagrams were obtained from the first 1000 frames of the control video.

Based on these paths, the turn direction, turn angle and total distance was obtained by performing path analysis. Table 6 shows the results:

TABLE 6

| | The control fish | | | |
|---|---|---|---|---|
| | Turn left (times) | Turn right (times) | TAI (times) | Total distance (cm) |
| Fish (a) | 567 | 574 | 89 | 3008.9 |
| Fish (b) | 450 | 525 | 114 | 2941.1 |

Similarly, the individual path of the experimental fish which were the lesion fish in this case was shown in FIG. 25(c) and FIG. 25(d). The turn direction, turn angle and total distance were shown in the following Table:

TABLE 4

| | The comparison of two methods | |
|---|---|---|
| | Extrapolation Method | Skeleton Analysis Method |
| Average Accuracy | 80% | 90% |
| Advantage | 1. The execution time is faster.<br>2. For the few fish or simple occlusion situation is more efficient. | 1. More robust.<br>2. Better tracking accuracy.<br>3. Can solve most occlusions.<br>4. Without need of the additional parameter.<br>5. Adding head and tail to locate the fish.<br>6. Hierarchically tracking. |
| Disadvantage | 1. The window size depends on the occlusion.<br>2. The tracking accuracy decreases when the number of fish increases.<br>3. Blind extrapolation.<br>4. Error propagation. | 1. Cost more time.<br>2. The frames rate must be high enough to capture the swimming fish. |

TABLE 5

| | The average execution time (sec/frame) | | | | | |
|---|---|---|---|---|---|---|
| | Number of fish | | | | | |
| | 3 | 4 | 5 | 6 | 7 | 8 |
| Extrapolation | 0.28 | 0.31 | 0.35 | 0.39 | 0.43 | 0.47 |
| Skeleton Analysis | 0.56 | 0.63 | 0.70 | 0.76 | 0.85 | 0.96 |

TABLE 7

| | The experimental fish | | | |
|---|---|---|---|---|
| | Turn left (times) | Turn right (times) | TAI (times) | Total distance (cm) |
| Fish (c) | 295 | 437 | 3 | 2570 |
| Fish (d) | 222 | 464 | 27 | 2176.6 |

Therefore according to formulae 8.1~8.4 DI, TDI, TAI and ZMI could be obtained as follows:

$$DI = \frac{\left(\frac{3008.9+2941.1}{2}\right)-\left(\frac{2570+2176.6}{2}\right)}{\left(\frac{3008.9+2941.1}{2}\right)+\left(\frac{2570+2176.6}{2}\right)} = 0.1126$$

$$TDI = \frac{\left|\left(\frac{437+464}{2}\right)_{right}-\left(\frac{295+222}{2}\right)_{left}\right|}{\left(\frac{437+464}{2}\right)_{right}+\left(\frac{295+222}{2}\right)_{left}} - \frac{\left|\left(\frac{574+525}{2}\right)_{right}-\left(\frac{567+450}{2}\right)_{left}\right|}{\left(\frac{574+525}{2}\right)_{right}+\left(\frac{567+450}{2}\right)_{left}}$$

$$= 0.2321$$

$$TAI = \frac{\left|\left(\frac{89+114}{2}\right)-\left(\frac{3+27}{2}\right)\right|}{\left(\frac{89+114}{2}\right)+\left(\frac{3+27}{2}\right)} = 0.7425$$

$$ZMI = 0.1126 + 0.2321 + 0.7425 = 1.0872$$

So the overall procedures of behavior analysis were accomplished. For the behavior analysis, the role of the present invention was to track the fish as accurately as possible so that the behavior analysis was more reliable.

What is claimed is:

1. A method for tracking moving characteristics of at least two moving objects, comprising:
   (a) providing a video picture of the at least two moving objects;
   (b) transforming the video picture into a plurality of video frames;
   (c) identifying if there is an occlusion of the at least two moving objects on the plurality of video frames;
   (d) if there is no occlusion occurred, identifying and recording each object's position respectively of the at least two moving objects on the video frames;
   (e) if there is an occlusion occurred, locating non-occluded endpoints of physical frameworks of the moving objects in both an occluded situation and a non-occluded situation on the video frames, and then performing the following steps:
   (e1) identifying and recording position of non-occluded moving objects on the video frames before and during occlusion;
   (e2) creating a distance map of the endpoints of the physical frameworks of occluded moving objects based on a Euclidean distance and a turn direction of the endpoints of the physical frameworks of the occluded moving objects during occlusion on the video frames;
   (e3) comparing between the endpoints of the physical frameworks of the occluded moving objects on occlusive video frames and the endpoints of the physical frameworks of the occluded moving objects on previous video frames by using the distant map;
   (e4) selecting best matching endpoints with the smallest Euclidean distance and/or a similar turn direction on the previous video frames according to the distance map;
   (e5) extrapolating an information of the physical frameworks of the occluded moving objects on the video frames;
   (e6) interpolating the position of the occluded moving objects on the video frames; and
   (e7) recording the position of the occluded moving objects; and
   (f) tracking the moving characteristics of the at least two moving objects on the video frames.

2. The method of claim 1, wherein the position comprises a centroid and/or an endpoint.

3. The method of claim 1, wherein each of the non-occluded and occluded endpoints further comprises a head point and/or a tail point.

4. The method of claim 1, wherein the information of the physical frameworks comprises a vector, centroid, endpoint, turning angle, turning direction, speed, length and/or location.

5. The method of claim 1, wherein the moving objects further comprises living bodies.

6. The method of claim 5, wherein the living bodies comprise a fly, fish, mammals, birds, and/or human.

7. The method of claim 1, wherein the moving characteristics comprise paths, staying time, poses, centroids, endpoints, turning angles, turning frequency, rolling frequency, turning directions, speed, length and/or locations.

\* \* \* \* \*